United States Patent
Eguchi et al.

(10) Patent No.: US 10,097,806 B2
(45) Date of Patent: Oct. 9, 2018

(54) IMAGE PROCESSING APPARATUS, IMAGE PICKUP APPARATUS, IMAGE PROCESSING METHOD, NON-TRANSITORY COMPUTER-READABLE STORAGE MEDIUM FOR IMPROVING QUALITY OF IMAGE

(71) Applicant: CANON KABUSHIKI KAISHA, Tokyo (JP)

(72) Inventors: Kaoru Eguchi, Utsunomiya (JP); Chiaki Inoue, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 23 days.

(21) Appl. No.: 15/054,419

(22) Filed: Feb. 26, 2016

(65) Prior Publication Data

US 2016/0261842 A1   Sep. 8, 2016

(30) Foreign Application Priority Data

Mar. 2, 2015 (JP) .................................. 2015-039921

(51) Int. Cl.
*G06K 9/00* (2006.01)
*H04N 13/122* (2018.01)
(Continued)

(52) U.S. Cl.
CPC ........... *H04N 13/122* (2018.05); *G06T 5/002* (2013.01); *H04N 5/23229* (2013.01);
(Continued)

(58) Field of Classification Search
None
See application file for complete search history.

(56) References Cited

U.S. PATENT DOCUMENTS 8,345,144 B1 *  1/2013  Georgiev ............... G03B 11/00
                                              348/335
8,619,082 B1 * 12/2013  Ciurea .................... G06T 7/593
                                              345/427
(Continued)

FOREIGN PATENT DOCUMENTS

CN      102972032 A    3/2013
EP       2180362 A1    4/2010
(Continued)

OTHER PUBLICATIONS

Office Action issued in U.S. Appl. No. 15/054,597 dated Apr. 14, 2017.
(Continued)

*Primary Examiner* — Ryan P Potts
(74) *Attorney, Agent, or Firm* — Rossi, Kimms & McDowell LLP

(57) ABSTRACT

An image processing apparatus (204) includes an unnecessary component determiner (204*a*) which determines unnecessary component information of a parallax image based on difference information relating to a plurality of parallax images, a reduction processor (204*b*) which performs reduction processing on at least one of the parallax image, the difference information, and the unnecessary component information, a magnification processor (204*c*) which performs magnification processing on the unnecessary component information, and an unnecessary component reducer (204*d*) which reduces an unnecessary component, based on the unnecessary component information, from the parallax image or a synthesized image obtained by synthesizing the plurality of parallax images.

21 Claims, 21 Drawing Sheets

(51) Int. Cl.
  *H04N 13/139* (2018.01)
  *H04N 5/357* (2011.01)
  *H04N 5/232* (2006.01)
  *G06T 5/00* (2006.01)
  *H04N 13/00* (2018.01)

(52) U.S. Cl.
  CPC ......... *H04N 5/3572* (2013.01); *H04N 13/139* (2018.05); *G06T 2207/20012* (2013.01); *H04N 2013/0074* (2013.01); *H04N 2013/0088* (2013.01)

(56) References Cited

U.S. PATENT DOCUMENTS

| | | | | |
|---|---|---|---|---|
| 2001/0036302 | A1* | 11/2001 | Miller | G06T 3/0068 382/128 |
| 2002/0056808 | A1 | 5/2002 | Tsuneta et al. | |
| 2003/0164935 | A1* | 9/2003 | Kanemitsu | G01C 3/18 356/3.14 |
| 2006/0029272 | A1 | 2/2006 | Ogawa | |
| 2009/0046924 | A1 | 2/2009 | Morimitsu | |
| 2011/0019184 | A1 | 1/2011 | Iwane | |
| 2011/0150357 | A1* | 6/2011 | Prentice | G06T 5/009 382/274 |
| 2011/0216975 | A1* | 9/2011 | Rother | G06K 9/34 382/173 |
| 2012/0154551 | A1 | 6/2012 | Inoue | |
| 2012/0314103 | A1* | 12/2012 | Majewicz | H04N 5/2354 348/239 |
| 2013/0113892 | A1 | 5/2013 | Nakamaru | |
| 2013/0120614 | A1* | 5/2013 | Oyama | H04N 5/2351 348/234 |
| 2013/0194387 | A1 | 8/2013 | Hatakeyama | |
| 2015/0005659 | A1* | 1/2015 | Masumoto | A61B 6/032 600/538 |
| 2015/0264333 | A1 | 9/2015 | Ishiga | |
| 2016/0093029 | A1* | 3/2016 | Micovic | H04N 5/2355 348/229.1 |

FOREIGN PATENT DOCUMENTS

| | | |
|---|---|---|
| JP | 2008054206 A | 3/2008 |
| JP | 2011205531 A | 10/2011 |

OTHER PUBLICATIONS

Ng et al., "Light Field Photography with a Hand-held Plenoptic Camera", Standford Tech Report CTSR, pp. 1-11, Feb. 2005.

Lumsdaine et al., "Full Resolution Lightfield Rendering", Adobe Technical Report, pp. 1-12, Jan. 2008.

Office Action issued in U.S. Appl. No. 15/054,597 dated Aug. 4, 2017.

Office Action issued in U.S. Appl. No. 15/054,597 dated Nov. 29, 2017.

Office Action issued in Chinese Appln. No. 201610112223.6 dated Dec. 25, 2017. English translation provided.

Notice of Allowance issued in U.S. Appl. No. 15/054,597 dated Jul. 9, 2018.

\* cited by examiner

| 62 | 68 | 58 | 64 | 58 | 64 | 57 | 67 | 67 | 68 |
|---|---|---|---|---|---|---|---|---|---|
| 58 | 60 | 65 | 62 | 68 | 63 | 62 | 62 | 62 | 67 |
| 65 | 62 | 60 | 61 | 65 | 62 | 62 | 66 | 60 | 62 |
| 64 | 63 | 59 | 58 | 63 | 69 | 62 | 64 | 64 | 64 |
| 62 | 62 | 62 | 63 | 56 | 63 | 59 | 61 | 62 | 64 |
| 63 | 60 | 66 | 57 | 66 | 64 | 64 | 62 | 59 | 56 |
| 56 | 62 | 63 | 62 | 63 | 61 | 62 | 64 | 64 | 63 |
| 61 | 72 | 63 | 61 | 61 | 65 | 60 | 57 | 63 | 65 |
| 65 | 60 | 60 | 65 | 63 | 61 | 61 | 62 | 64 | 62 |
| 64 | 63 | 60 | 64 | 61 | 70 | 63 | 65 | 66 | 60 |

AVERAGE: 62.6
STANDARD DEVIATION: 2.98

FIG. 8A

| 64 | 63 | 67 | 63 | 63 | 61 | 59 | 64 | 64 | 65 |
|---|---|---|---|---|---|---|---|---|---|
| 61 | 60 | 62 | 61 | 64 | 63 | 61 | 65 | 59 | 56 |
| 62 | 61 | 63 | 60 | 63 | 62 | 61 | 63 | 63 | 61 |
| 63 | 62 | 61 | 61 | 63 | 61 | 63 | 64 | 67 | 58 |
| 61 | 62 | 62 | 61 | 60 | 63 | 60 | 64 | 60 | 66 |
| 66 | 61 | 62 | 60 | 59 | 63 | 64 | 61 | 64 | 66 |
| 64 | 65 | 60 | 62 | 61 | 65 | 63 | 62 | 68 | 56 |
| 65 | 64 | 62 | 64 | 64 | 63 | 61 | 62 | 61 | 63 |
| 64 | 59 | 64 | 63 | 62 | 62 | 65 | 61 | 66 | 63 |
| 63 | 62 | 65 | 64 | 63 | 65 | 66 | 64 | 65 | 62 |

AVERAGE: 62.6
STANDARD DEVIATION: 2.17

FIG. 8B

| 126 | 131 | 125 | 127 | 121 | 125 | 116 | 131 | 131 | 133 |
|---|---|---|---|---|---|---|---|---|---|
| 119 | 120 | 127 | 123 | 132 | 126 | 123 | 127 | 121 | 123 |
| 127 | 123 | 123 | 121 | 128 | 124 | 123 | 129 | 123 | 123 |
| 127 | 125 | 120 | 119 | 126 | 130 | 125 | 128 | 131 | 122 |
| 123 | 124 | 124 | 124 | 116 | 126 | 119 | 125 | 122 | 130 |
| 129 | 121 | 128 | 117 | 125 | 127 | 128 | 123 | 123 | 122 |
| 120 | 127 | 123 | 124 | 124 | 126 | 125 | 126 | 132 | 119 |
| 126 | 136 | 125 | 125 | 125 | 128 | 121 | 119 | 124 | 128 |
| 129 | 119 | 124 | 128 | 125 | 123 | 126 | 123 | 130 | 125 |
| 127 | 125 | 125 | 128 | 124 | 135 | 129 | 129 | 131 | 122 |

AVERAGE: 125.1
STANDARD DEVIATION: 3.91

| 0 | 5 | 0 | 1 | 0 | 3 | 0 | 3 | 3 | 3 |
|---|---|---|---|---|---|---|---|---|---|
| 0 | 0 | 3 | 1 | 4 | 0 | 1 | 0 | 3 | 11 |
| 3 | 1 | 0 | 1 | 2 | 0 | 1 | 3 | 0 | 1 |
| 1 | 1 | 0 | 0 | 0 | 8 | 0 | 0 | 0 | 6 |
| 1 | 0 | 0 | 2 | 0 | 0 | 0 | 0 | 2 | 0 |
| 0 | 0 | 4 | 0 | 7 | 1 | 0 | 1 | 0 | 0 |
| 0 | 0 | 3 | 0 | 2 | 0 | 0 | 2 | 0 | 7 |
| 0 | 8 | 1 | 0 | 0 | 2 | 0 | 0 | 2 | 2 |
| 1 | 1 | 0 | 2 | 1 | 0 | 0 | 1 | 0 | 0 |
| 1 | 1 | 0 | 0 | 0 | 5 | 0 | 1 | 1 | 0 |

| 2 | 0 | 9 | 0 | 5 | 0 | 2 | 0 | 0 | 0 |
|---|---|---|---|---|---|---|---|---|---|
| 3 | 0 | 0 | 0 | 0 | 0 | 0 | 3 | 0 | 0 |
| 0 | 0 | 3 | 0 | 0 | 0 | 0 | 0 | 3 | 0 |
| 0 | 0 | 2 | 3 | 0 | 0 | 1 | 0 | 3 | 0 |
| 0 | 0 | 0 | 0 | 4 | 0 | 1 | 3 | 0 | 2 |
| 3 | 1 | 0 | 3 | 0 | 0 | 0 | 0 | 5 | 10 |
| 8 | 3 | 0 | 0 | 0 | 4 | 1 | 0 | 4 | 0 |
| 4 | 0 | 0 | 3 | 3 | 0 | 1 | 5 | 0 | 0 |
| 0 | 0 | 4 | 0 | 0 | 1 | 4 | 0 | 2 | 1 |
| 0 | 0 | 5 | 0 | 2 | 0 | 3 | 0 | 0 | 2 |

| 62 | 63 | 58 | 63 | 58 | 61 | 57 | 64 | 64 | 65 |
|---|---|---|---|---|---|---|---|---|---|
| 58 | 60 | 62 | 61 | 64 | 63 | 61 | 62 | 59 | 56 |
| 62 | 61 | 60 | 60 | 63 | 62 | 61 | 63 | 60 | 61 |
| 63 | 62 | 59 | 58 | 63 | 61 | 62 | 64 | 64 | 58 |
| 61 | 62 | 62 | 61 | 56 | 63 | 59 | 61 | 60 | 64 |
| 63 | 60 | 62 | 57 | 59 | 63 | 64 | 61 | 59 | 56 |
| 56 | 62 | 60 | 62 | 61 | 61 | 62 | 62 | 64 | 56 |
| 61 | 64 | 62 | 61 | 61 | 63 | 60 | 57 | 61 | 63 |
| 64 | 59 | 60 | 63 | 62 | 61 | 61 | 61 | 64 | 62 |
| 63 | 62 | 60 | 64 | 61 | 65 | 63 | 64 | 65 | 60 |

AVERAGE: 61.2
STANDARD DEVIATION: 2.21

| 62 | 63 | 58 | 63 | 58 | 61 | 57 | 64 | 64 | 65 |
|---|---|---|---|---|---|---|---|---|---|
| 58 | 60 | 62 | 61 | 64 | 63 | 61 | 62 | 59 | 56 |
| 62 | 61 | 60 | 60 | 63 | 62 | 61 | 63 | 60 | 61 |
| 63 | 62 | 59 | 58 | 63 | 61 | 62 | 64 | 64 | 58 |
| 61 | 62 | 62 | 61 | 56 | 63 | 59 | 61 | 60 | 64 |
| 63 | 60 | 62 | 57 | 59 | 63 | 64 | 61 | 59 | 56 |
| 56 | 62 | 60 | 62 | 61 | 61 | 62 | 62 | 64 | 56 |
| 61 | 64 | 62 | 61 | 61 | 63 | 60 | 57 | 61 | 63 |
| 64 | 59 | 60 | 63 | 62 | 61 | 61 | 61 | 64 | 62 |
| 63 | 62 | 60 | 64 | 61 | 65 | 63 | 64 | 65 | 60 |

AVERAGE: 61.2
STANDARD DEVIATION: 2.21

| 124 | 126 | 116 | 126 | 116 | 122 | 114 | 128 | 128 | 130 |
|---|---|---|---|---|---|---|---|---|---|
| 116 | 120 | 124 | 122 | 128 | 126 | 122 | 124 | 118 | 112 |
| 124 | 122 | 120 | 120 | 126 | 124 | 122 | 126 | 120 | 122 |
| 126 | 124 | 118 | 116 | 126 | 122 | 124 | 128 | 128 | 116 |
| 122 | 124 | 124 | 122 | 112 | 126 | 118 | 122 | 120 | 128 |
| 126 | 120 | 124 | 114 | 118 | 126 | 128 | 122 | 118 | 112 |
| 112 | 124 | 120 | 124 | 122 | 122 | 124 | 124 | 128 | 112 |
| 122 | 128 | 124 | 122 | 122 | 126 | 120 | 114 | 122 | 126 |
| 128 | 118 | 120 | 126 | 124 | 122 | 122 | 122 | 128 | 124 |
| 126 | 124 | 120 | 128 | 122 | 130 | 126 | 128 | 130 | 120 |

AVERAGE: 122.5
STANDARD DEVIATION: 4.43

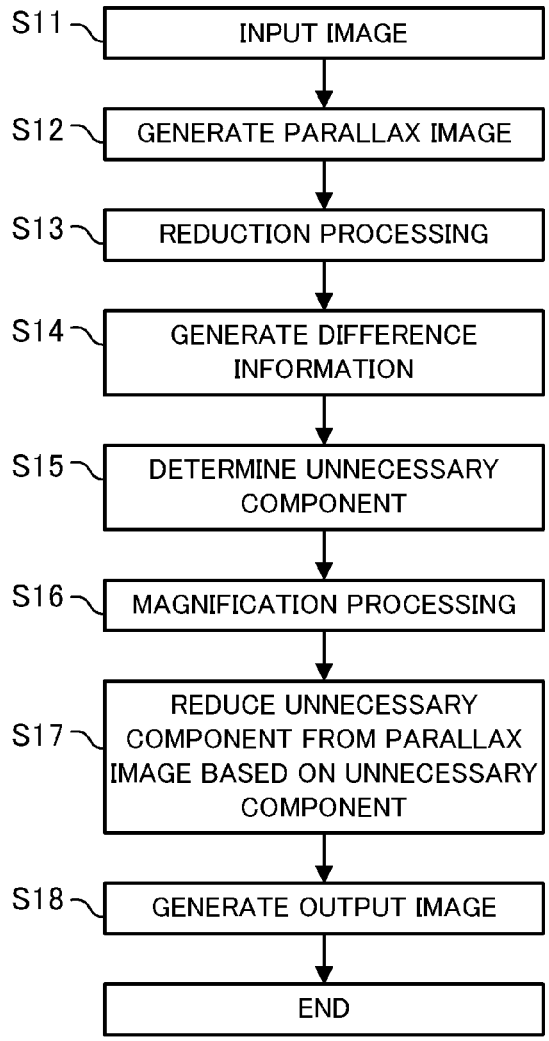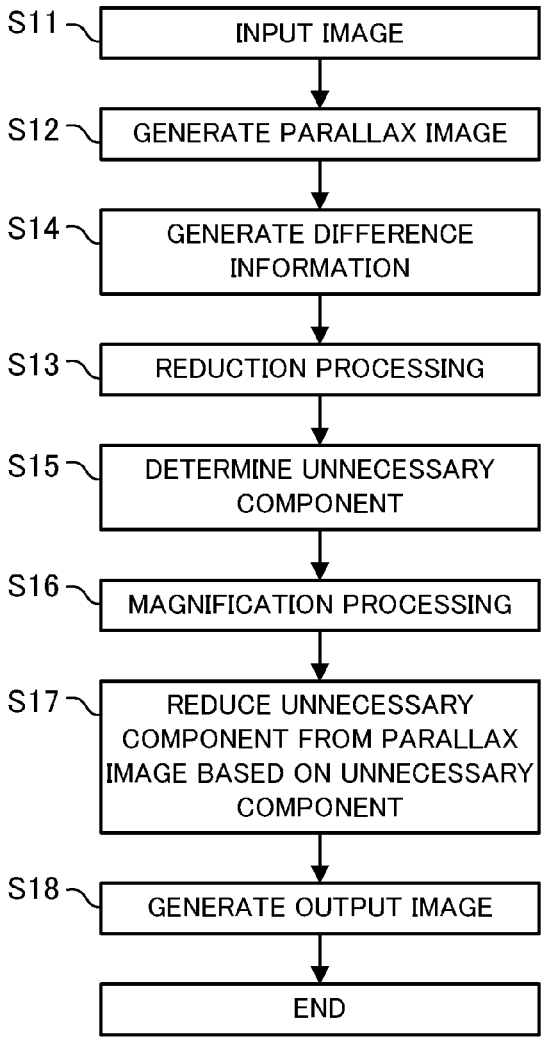
FIG. 9
FIG. 10

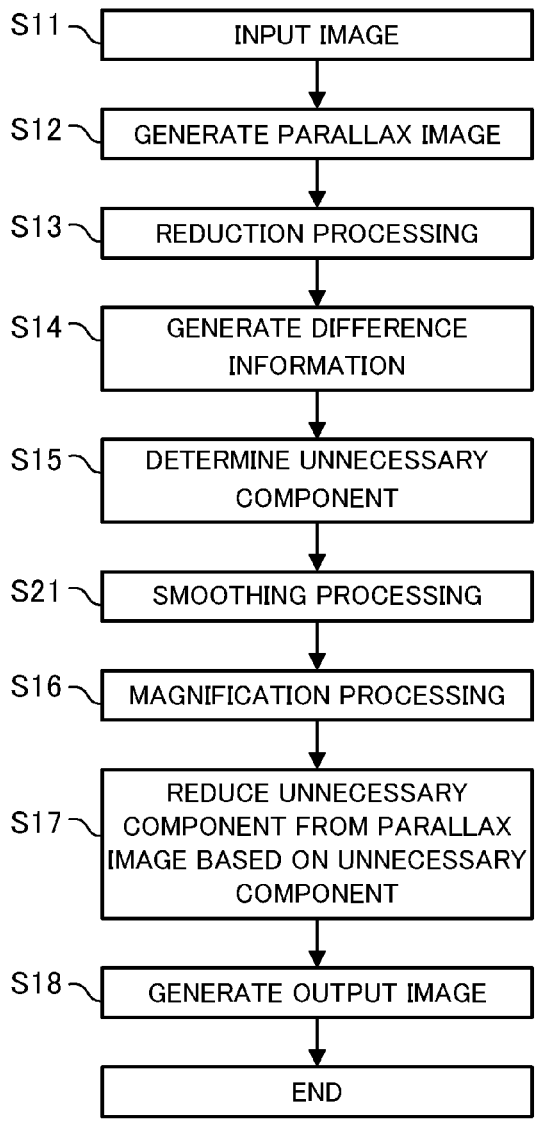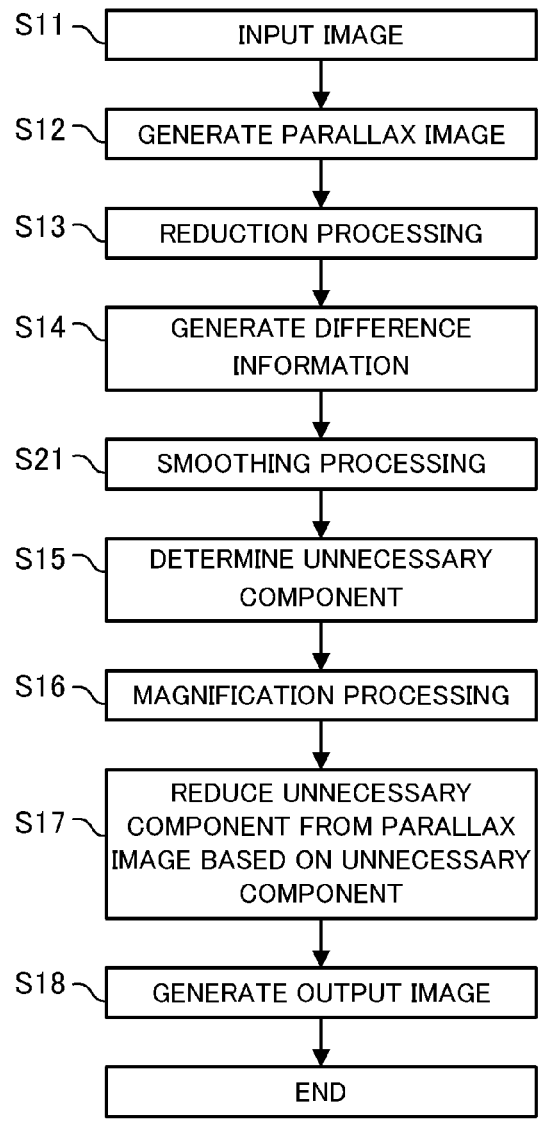

IMAGE PROCESSING APPARATUS, IMAGE PICKUP APPARATUS, IMAGE PROCESSING METHOD, NON-TRANSITORY COMPUTER-READABLE STORAGE MEDIUM FOR IMPROVING QUALITY OF IMAGE

BACKGROUND OF THE INVENTION

Field of the Invention

The present invention relates to an image processing method for improving a quality of a captured image.

Description of the Related Art

In image capturing through an image pickup apparatus such as a camera, part of light incident on an optical system may be reflected by a surface of a lens and a member holding the lens and arrive at an imaging plane as unnecessary light. This unnecessary light appears as an unnecessary component such as a ghost and a flare in a captured image. When a diffractive optical element is used in a telephoto lens to correct longitudinal (axial) chromatic aberration and chromatic aberration of magnification, light from a high intensity object such as the sun outside an angle of view for the image capturing may be incident on the diffractive optical element, generating unnecessary light as an unnecessary component over the entire image. Previously, a method of removing the unnecessary component by using digital image processing is known.

Japanese Patent Laid-open No. 2008-54206 discloses a method of detecting a ghost based on a difference image indicating a difference between an image (in-focus image) when an optical system is in focus on an object and an image (defocus image) when the image pickup optical system is out of focus. However, the method disclosed in Japanese Patent Laid-open No. 2008-54206 requires image capturing to be performed a plurality of times and thus is not suitable for still image pickup and moving image pickup of a moving object.

Japanese Patent Laid-open No. 2011-205531 discloses a method of detecting a ghost based on comparison of a plurality of parallax images captured by a single-lens stereoscopic image capturing. The method disclosed in Japanese Patent Laid-open No. 2011-205531, which obtains a plurality of parallax images by single image capturing, is applicable to still image capturing and moving image capturing of a moving object.

However, the method disclosed in Japanese Patent Laid-open No. 2011-205531 detects the ghost by calculating a difference between a primary image and a secondary image. However, if the difference is to be obtained simply for all pixels, calculation processing load is large and accordingly it is difficult to perform the processing in real time. Furthermore, in the processing only of the difference calculation, a noise increases and accordingly it is difficult to maintain a high quality of an image.

SUMMARY OF THE INVENTION

The present invention provides an image processing apparatus, an image pickup apparatus, an image processing method, and a non-transitory computer-readable storage medium which are capable of effectively determining an unnecessary component contained in a captured image without imaging a plurality of times to reduce processing load and maintain a high quality of an image.

An image processing apparatus as one aspect of the present invention includes an unnecessary component determiner configured to determine unnecessary component information of a parallax image based on difference information relating to a plurality of parallax images, a reduction processor configured to perform reduction processing on at least one of the parallax image, the difference information, and the unnecessary component information, a magnification processor configured to perform magnification processing on the unnecessary component information, and an unnecessary component reducer configured to reduce an unnecessary component, based on the unnecessary component information, from the parallax image or a synthesized image obtained by synthesizing the plurality of parallax images.

An image pickup apparatus as another aspect of the present invention includes an image pickup device configured to photoelectrically convert an optical image formed via an optical system to output a plurality of parallax images, an unnecessary component determiner configured to determine unnecessary component information of a parallax image based on difference information relating to the plurality of parallax images, a reduction processor configured to perform reduction processing on at least one of the parallax image, the difference information, and the unnecessary component information, a magnification processor configured to perform magnification processing on the unnecessary component information, and an unnecessary component reducer configured to reduce an unnecessary component, based on the unnecessary component information, from the parallax image or a synthesized image obtained by synthesizing the plurality of parallax images.

An image processing method as another aspect of the present invention includes the steps of determining unnecessary component information of a parallax image based on difference information relating to a plurality of parallax images, performing reduction processing on at least one of the parallax image, the difference information, and the unnecessary component information, performing magnification processing on the unnecessary component information, and reducing an unnecessary component, based on the unnecessary component information, from the parallax image or a synthesized image obtained by synthesizing the plurality of parallax images.

A non-transitory computer-readable storage medium as another aspect of the present invention stores a program causing a computer to execute a process including the steps of determining unnecessary component information of a parallax image based on difference information relating to a plurality of parallax images, performing reduction processing on at least one of the parallax image, the difference information, and the unnecessary component information, performing magnification processing on the unnecessary component information, and reducing an unnecessary component, based on the unnecessary component information, from the parallax image or a synthesized image obtained by synthesizing the plurality of parallax images.

Further features and aspects of the present invention will become apparent from the following description of exemplary embodiments with reference to the attached drawings.

BRIEF DESCRIPTION OF THE DRAWINGS

FIGS. 8A to 8H are explanatory diagrams of an amount of noise when reduction processing is not performed.

FIG. 9 is a flowchart of illustrating an image processing method in Embodiment 1.

FIG. 10 is a flowchart of illustrating an image processing method in Embodiment 1.

FIG. 13 is a flowchart of illustrating an image processing method in Embodiment 2.

FIG. 14 is a flowchart of illustrating an image processing method in Embodiment 2.

DESCRIPTION OF THE EMBODIMENTS

Exemplary embodiments of the present invention will be described below with reference to the accompanied drawings.

In each embodiment, an image pickup apparatus capable of generating a plurality of parallax images includes an image pickup system that guides a plurality of light beams passing through regions of a pupil of an optical system (image pickup optical system) that are different from each other, to light-receiving portions (pixels) of an image pickup element that are different from each other to perform photoelectric conversions.

[Embodiment 1]

Figure 3:
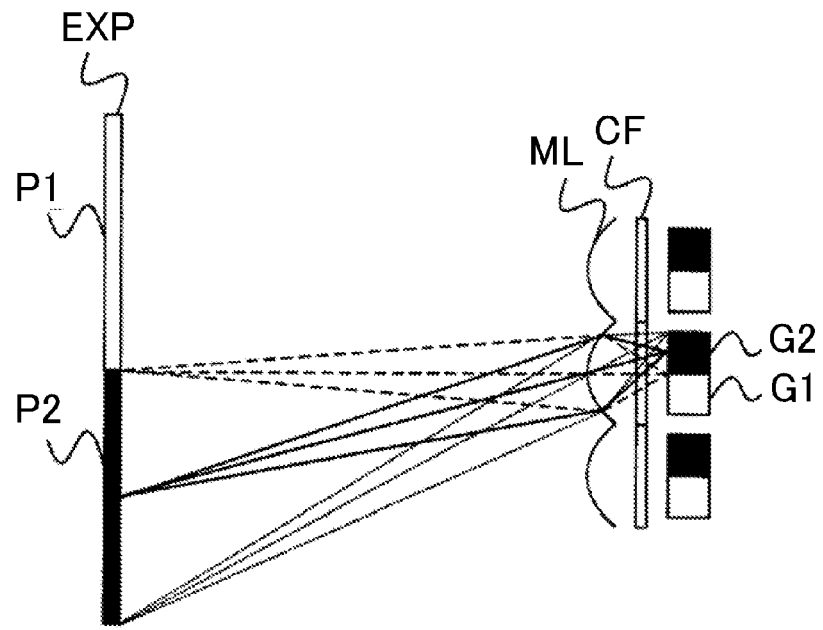
FIG. 3 is a relational diagram of a light-receiving portion of an image pickup element and a pupil of an optical system in an image pickup system in each of Embodiments 1 and 2.

First of all, Embodiment 1 of the present invention will be described. FIG. 3 illustrates a relation between light-receiving portions of an image pickup element in an image pickup system in this embodiment and a pupil of an optical system. In FIG. 3, symbol ML represents a micro lens, and symbol CF represents a color filter. Symbol EXP represents an exit pupil (pupil) of the optical system, and symbols P1 and P2 represent regions of the exit pupil EXP. Symbols G1 and G2 represent pixels (light-receiving portions), and one pixel G1 and one pixel G2 make a pair (the pixels G1 and G2 are disposed to share a single micro lens ML). The image pickup element includes an array of a plurality of pairs (pixel pairs) of the pixels G1 and G2. The paired pixels G1 and G2 have a conjugate relation with the exit pupil EXP via the shared (that is, provided for each pixel pair) micro lens ML. In each embodiment, the pixels G1 and G2 arrayed in the image pickup element are also referred to as pixel groups G1 and G2, respectively.

Figure 4:
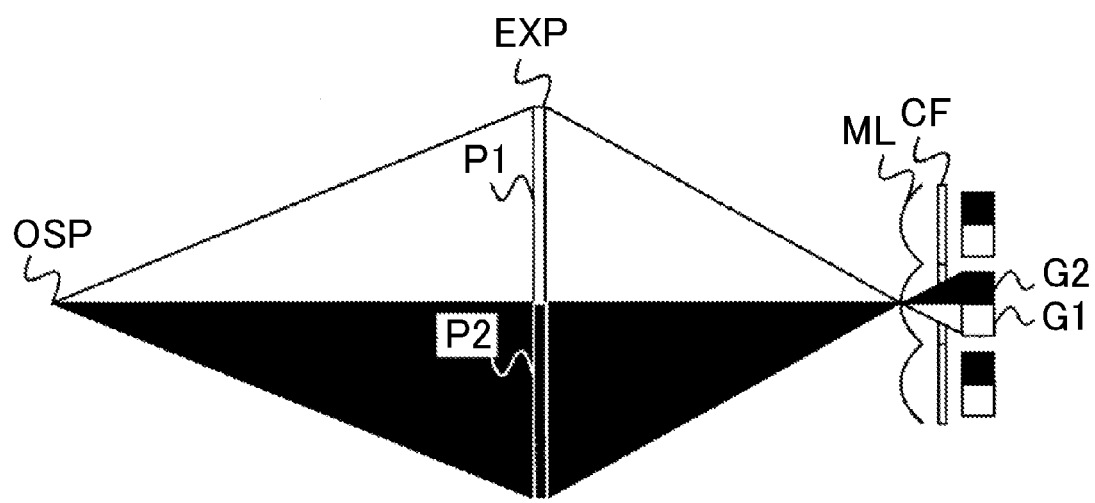
FIG. 4 is a schematic diagram of the image pickup system in each of Embodiments 1 and 2.

FIG. 4 is a schematic diagram of the image pickup system in this embodiment which is assumed to have a configuration in which instead of the micro lens ML illustrated in FIG. 3, a thin lens is provided at the position of the exit pupil EXP. The pixel G1 receives a light beam passing through a region P1 of the exit pupil EXP. The pixel G2 receives a light beam passing through a region P2 of the exit pupil EXP. Symbol OSP represents an object point for which image capturing (image pickup) is performed. The object point OSP does not necessarily need to have an object located thereon. A light beam passing through the object point OSP is incident on one of the pixel G1 and the pixel G2 depending on a position (the region P1 or the region P2 in this embodiment) in the pupil (exit pupil EXP) through which the light beam passes. Travelling of light beams through regions of the pupil that are different from each other corresponds to separation of incident light from the object point OSP by its angle (parallax). In other words, for each micro lens ML corresponding to the pixels G1 and G2, an image based on an output signal from the pixel G1 and an image based on an output signal from the pixel G2 are generated as a plurality of (in this example, a pair of) parallax images having parallaxes with each other. Hereinafter, reception of light beams passing through the regions of the pupil that are different from each other by the light-receiving portions (pixels) different from each other may be referred to as pupil division.

When the conjugate relation is not completely held due to, for example, a position shift of the exit pupil EXP illustrated in FIGS. 3 and 4, or when the regions P1 and P2 partially overlap with each other, a plurality of obtained images are still treated as parallax images in this embodiment. A minimum element that constitutes an image is called a pixel (pixel signal), which is distinguished from a pixel on the image pickup element, and each pixel represents a light intensity and color according to its numerical value. A value of each pixel is referred to as a pixel value. The image is categorized as a color image, a gray scale image, a binary image, and the like according to the capacity or characteristics of the pixel value.

Figure 5:
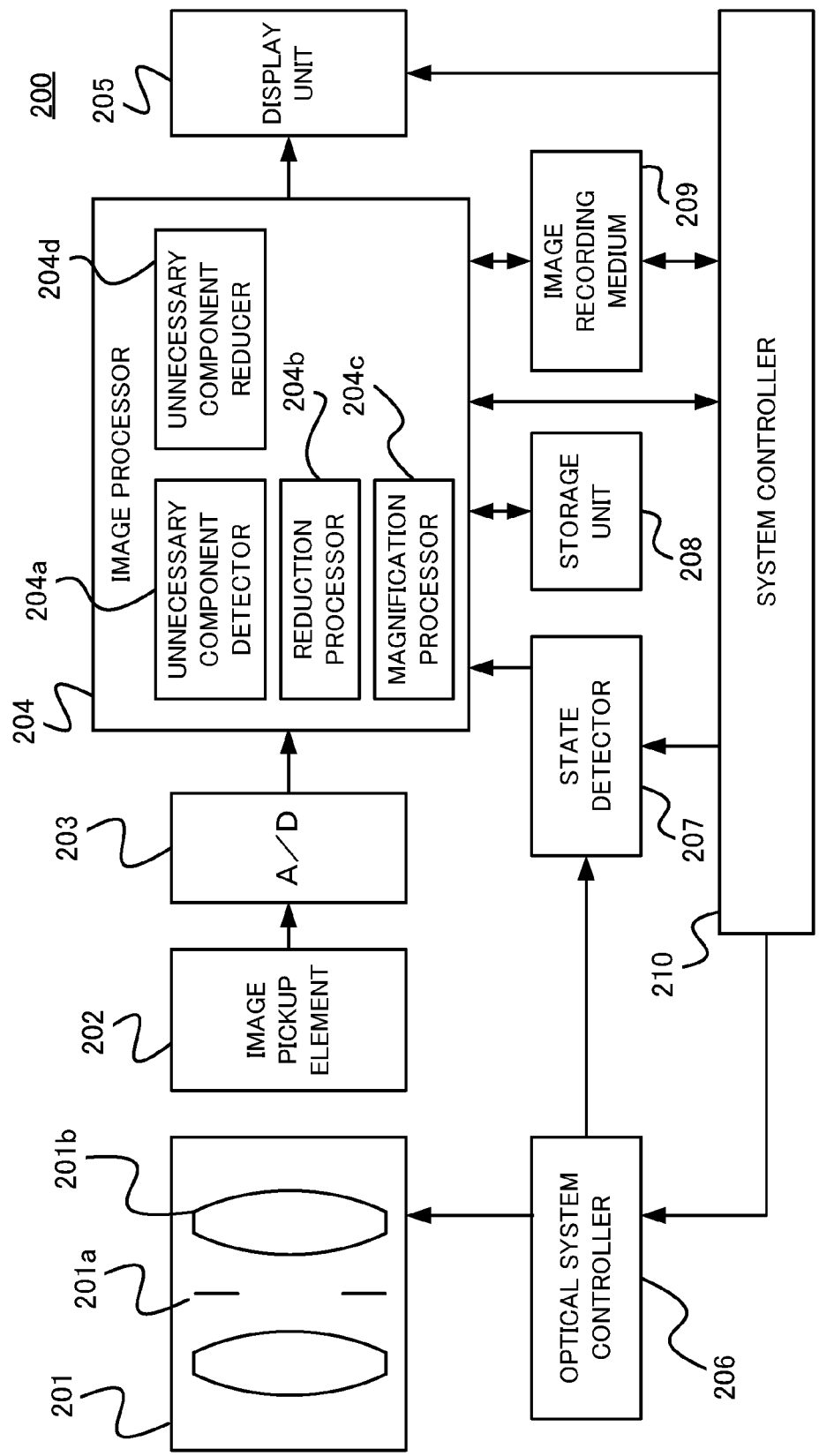
FIG. 5 is a block diagram of an image pickup apparatus in Embodiment 1.

Next, referring to FIG. 5, an image pickup apparatus that executes an image processing method in this embodiment will be described. FIG. 5 is a block diagram of illustrating a configuration of an image pickup apparatus 200 in this embodiment. An optical system 201 (image pickup optical system) includes an aperture stop 201a and a focus lens 201b, and causes light from an object (not illustrated) to be imaged (condensed) on an image pickup element 202. The image pickup element 202 (image pickup device) includes a photoelectric conversion element such as a CCD sensor and a CMOS sensor, and receives light beams passing through regions of the pupil that are different from each other, through pixels (light-receiving portions) corresponding to the respective regions (performs the pupil division), as described referring to FIGS. 3 and 4. In this manner, the image pickup element 202 performs a photoelectric conversion on an object image (optical image) formed via the optical system 201 and outputs image signals (analog electric signals) as a plurality of parallax images. An A/D converter 203 converts the analog electric signals output from the image pickup element 202 into digital signals, and then outputs these digital signals to an image processor 204.

The image processor 204 performs typical image processing on the digital signals, and also performs determination processing of unnecessary light (unnecessary component) and correction processing to reduce or remove the unnecessary light. In this embodiment, the image processor 204 corresponds to an image processing apparatus incorporated in the image pickup apparatus 200. The image processor 204 includes an unnecessary component detector 204a (unnecessary component determiner), a reduction processor 204b, a magnification processor 204c, and an unnecessary component reducer 204d.

The unnecessary component detector 204a generates (acquires) parallax images and detects (determines) an unnecessary component based on the parallax images. The reduction processor 204b performs reduction processing on an image. The magnification processor 204c magnifies the image reduced by the reduction processor 204b to restore a size of the reduced image to an original size. The unnecessary component reducer 204d reduces the unnecessary component from each of the parallax images. In this embodiment, the parallax images can be output and generated as "an image formed only by the pixel group G1" and "an image formed by only by the pixel group G2" in a form previously separated into the two images. Alternatively, "an image formed only the pixel group G1" and "a synthesized image of the pixel groups G1 and G2" may be output first, and then an image formed only by the pixel group G1 may be subtracted from the synthesized image to calculate and obtain an image corresponding to the image formed only by the pixel group G2.

The output image (image data) processed by the image processor 204 is stored in an image recording medium 209 such as a semiconductor memory and an optical disk. The output image from the image processor 204 can be displayed on a display unit 205. A storage unit 208 (memory) stores an image processing program and various kinds of information needed for the image processing by the image processor 204.

A system controller 210 (controller, processor, or CPU) controls the operation of the image pickup element 202, the processing by the image processing unit 204, and the optical system 201 (the aperture stop 201a and the focus lens 201b). An optical system controller 206 performs mechanical drive of the aperture stop 201a and the focus lens 201b of the optical system 201 in response to a control instruction from the system controller 210. The aperture stop 201a has its opening diameter controlled in accordance with a set aperture value (F-number). The focus lens 201b has its position controlled by an autofocus (AF) system and a manual focus mechanism (not illustrated) to perform focusing (focus control) in accordance with an object distance. A state detector 207 acquires current image capturing condition information in response to a control instruction from the system controller 210. In this embodiment, the optical system 201 is included as part of the image pickup apparatus 200 (integrally with the image pickup apparatus 200) including the image pickup element 202, but is not limited thereto. Like a single-lens reflex camera, the image pickup system may include an interchangeable optical system (interchangeable lens) detachably attached to an image pickup apparatus body.

Figure 6A:
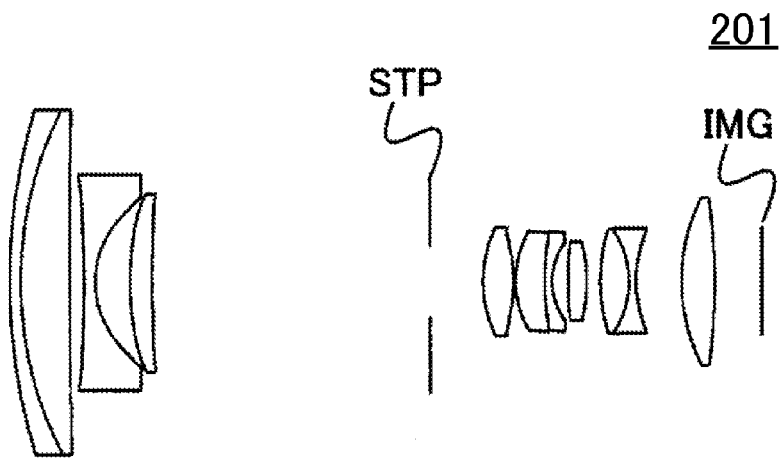
FIGS. 6A and 6B are diagrams of a configuration of the optical system and an explanatory diagram of unnecessary light occurring in the optical system in Embodiment 1.
Figure 6B:
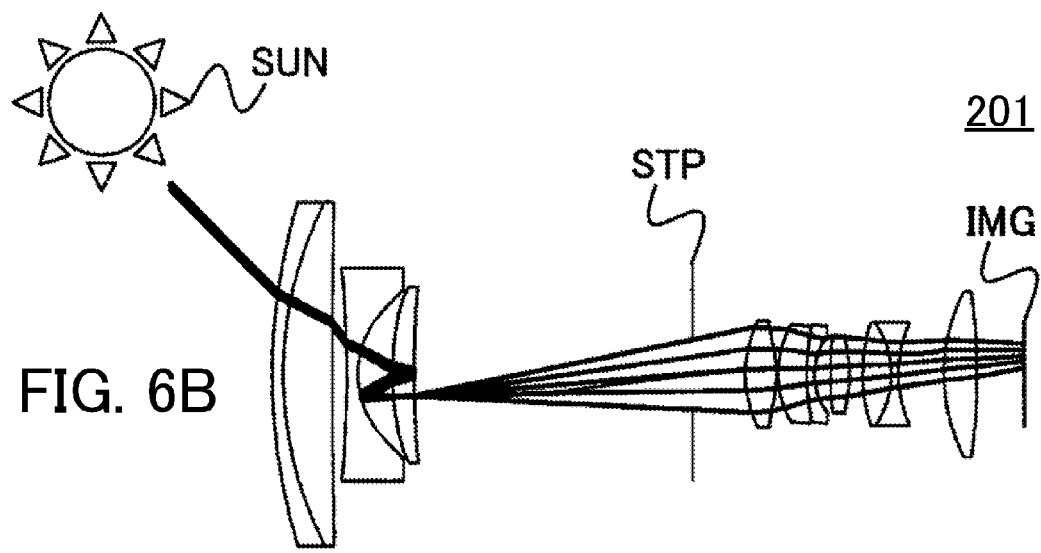

FIGS. 6A and 6B are a configuration diagram of the optical system 201 and an explanatory diagram of unnecessary light occurring in the optical system 201, respectively. FIG. 6A specifically illustrates an exemplary configuration of the optical system 201. In FIG. 6A, symbol STP represents an aperture stop (corresponding to the aperture stop 201a), and symbol IMG represents an imaging plane. The image pickup element 202 illustrated in FIG. 5 is disposed at the position of the imaging plane IMG. FIG. 6B illustrates a case in which strong light from the sun denoted with SUN as an exemplary high luminance object is incident on the optical system 201, and light reflected at a surface of a lens included in the optical system 201 arrives as unnecessary light (ghost or flare) at the imaging plane IMG.

Figure 7:
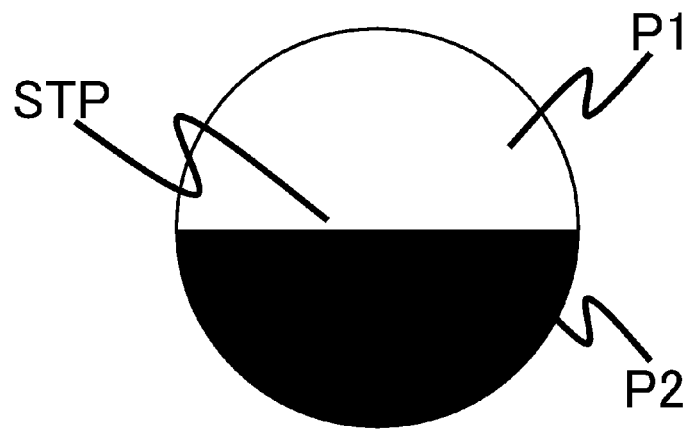
FIG. 7 is an explanatory diagram of unnecessary light passing through an aperture stop of the optical system in Embodiment 1.

FIG. 7 illustrates the regions P1 and P2 (pupil regions or pupil division regions) of the aperture stop STP, through which light beams incident on the pixels G1 and G2 illustrated in FIG. 4 pass. The aperture stop STP can be assumed to correspond to the exit pupil EXP (i.e., virtual image when seen from an imaging plane position of the optical system 201) of the optical system 201, but in practice, it is often the case that the aperture stop STP and the exit pupil EXP are different from each other. Although a light beam from the high luminance object (SUN) passes through an almost entire region of the aperture stop STP, a region through which the light beams to be incident on the pixels G1 and G2 pass is divided into the regions P1 and P2 (pupil regions). In the example illustrated in FIG. 6B, the light beam from the high luminance object passes through a region approximately at the upper half of the aperture stop STP, and it is a situation in which the light beam passes through the region P1 (pupil region) referring to FIG. 4. This light beam passes through the region P1, and then it enters the pixel G1.

Figure 1A:
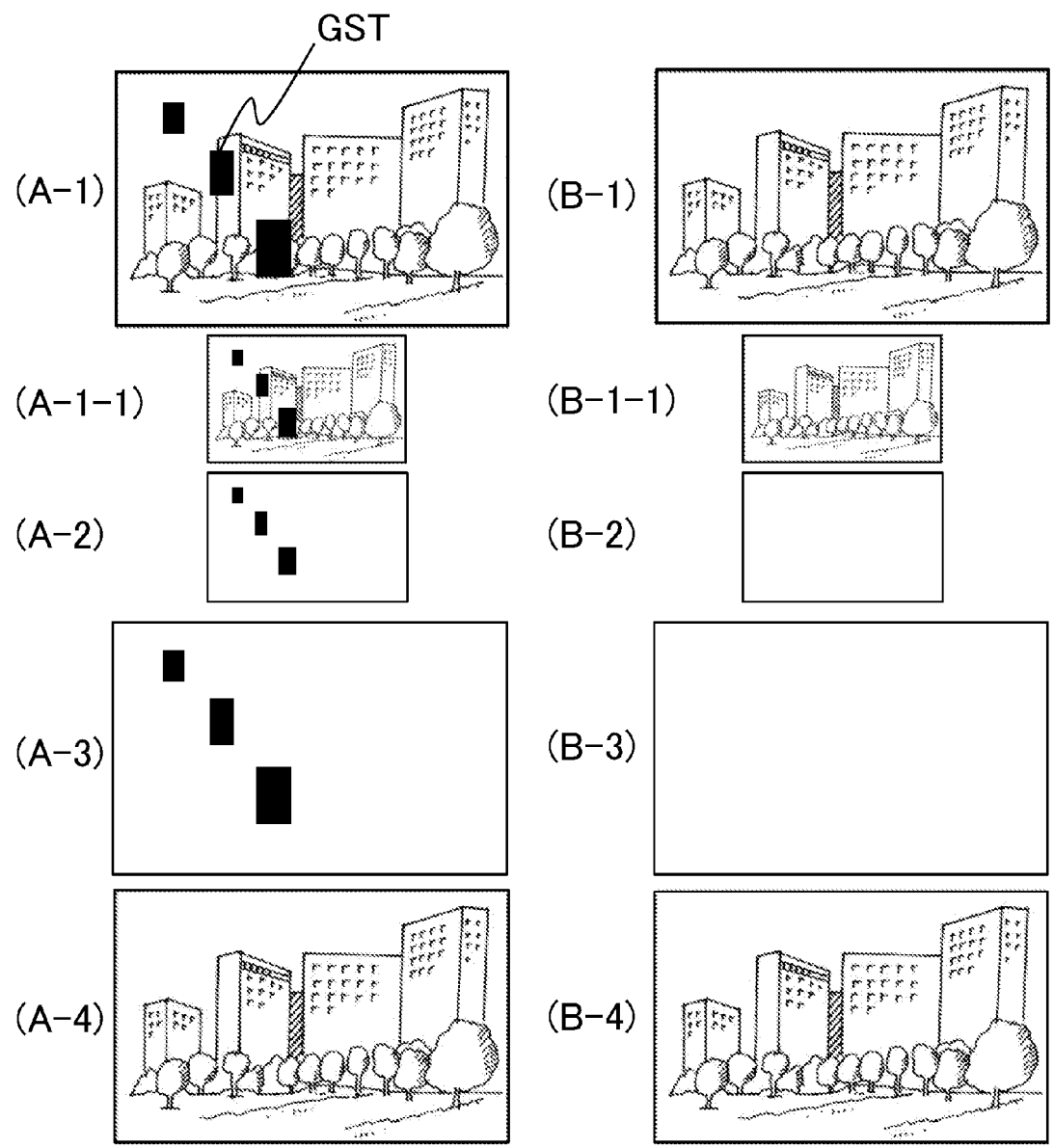
FIGS. 1A and 1B are diagrams of illustrating a procedure of an image processing method in Embodiment 1.
Figure 1B:
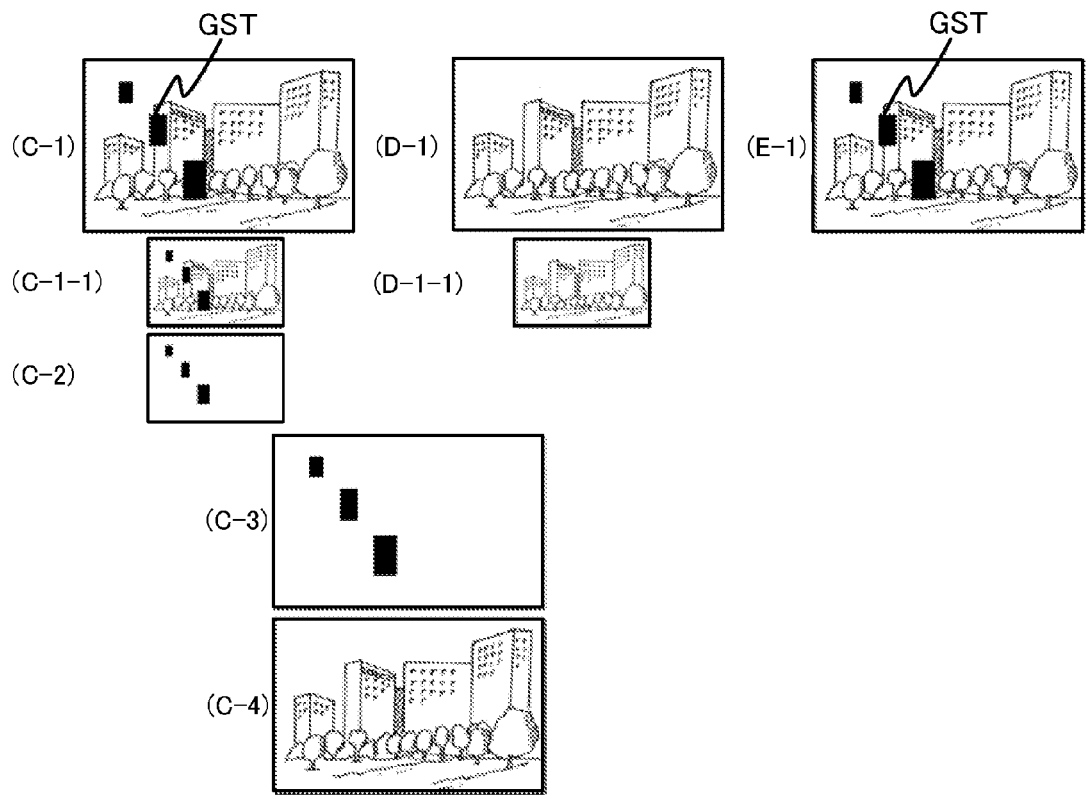
Figures 2A, 2B:
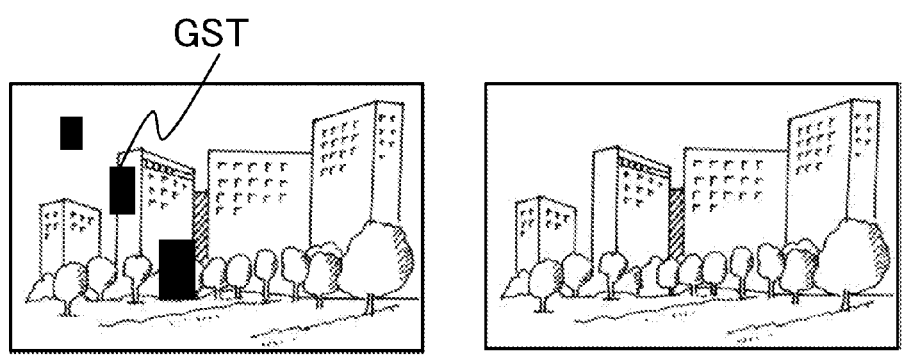
FIGS. 2A and 2B are exemplary output images obtained by the image processing method in Embodiment 1.

Next, referring to FIGS. 1A and 1B and FIGS. 2A and 2B, a method of determining an unnecessary component as an image component that appears through a photoelectric conversion of unnecessary light in a captured image generated by the image pickup apparatus 200 will be described. FIGS. 1A and 1B are diagrams of illustrating a procedure of the image processing method in this embodiment. FIGS. 2A and 2B are examples of output images obtained by the image processing method in this embodiment.

FIG. 2A illustrates a captured image which is generated through image pickup (imaging or image capturing) without the pupil division. This captured image includes objects as buildings and trees existing at the periphery of the buildings. Symbol GST indicated as a black square shape in the captured image in FIG. 2A is an unnecessary component (ghost component) as an image component corresponding to unnecessary light (ghost). In FIG. 2A, the unnecessary component GST is illustrated in black, but in reality, it is somewhat transparent enough to see objects. The unnecessary component corresponds to unnecessary light on a captured object, and thus has luminance higher than that of the captured object. This is true also in other embodiments described below.

FIGS. 1A (A-1) and 1A (B-1) illustrate a pair of parallax images which are obtained as a result of the photoelectric conversion of the light beams passing through the regions P1 and P2 (pupil regions) by the pixel groups G1 and G2. For easy understanding, the parallax image obtained from the pixel group G1 and the parallax image obtained from the pixel group G2 are illustrated as FIG. 1A (A-1) and FIG. 1A (B-1) separately. In actual processing, however, the processing may be performed after the image is separated, or image information in a state where the pixel groups G1 and G2 can be determined on a system may be used while the image is not separated as each parallax image.

When an object is located at a close range, a difference (parallax component of the object) corresponding to a parallax exists in an image component of the pair of parallax images. However, when an object, obtained by capturing the landscape as illustrated in FIG. 1A, is located at a far distance, an amount of the parallax component of the object is a tiny amount. The pair of parallax images contains the unnecessary component GST schematically illustrated as a black square, but the position of the unnecessary component GST is different from each other between the parallax images. In this embodiment, an example in which the unnecessary components GST are separated without overlapping with each other is described, but they may overlap with each other to have a luminance difference. In other words, the position or the luminance of the unnecessary component GST indicated as a black square only has to be different from each other.

FIG. 1A (A-1-1) and FIG. 1A (B-1-1) are results of reduction processing on the pair of parallax images illustrated in FIG. 1A (A-1) and FIG. 1A (B-1), respectively. The reduction processing is for example decimating processing between pixels, averaging of pixel values of a plurality of peripheral pixels, or processing of combining pixel values of a plurality of pixels to one pixel value by using a certain weight (so-called pixel addition processing), but it is not limited thereto. A reduction rate can be set appropriately depending on an original size of the parallax image. In this case, the unnecessary component to be reduced only needs to remain after the reduction processing, and accordingly the size of the parallax image can be reduced to around 1/10 of the original image size when an area of the unnecessary component is sufficiently large. If the size (area) of the unnecessary component is recognized by a known method, the reduction rate may be determined according to the size of the unnecessary component so that the unnecessary component is not collapsed by the reduction processing to determine the reduction processing.

In this embodiment, smoothing processing may be performed before the reduction processing is performed. This is because a moire may occur after the reduction processing if there is an object having a high frequency component in a spatial frequency when the reduction processing is performed especially by using the decimating processing between pixels. In order to avoid this, it is preferred that low-pass filter processing depending on the reduction rate is performed on image information before the reduction processing. Specifically, for example, it is preferred that a Nyquist frequency obtained based on a size of the reduced image is set as a cutoff frequency and a low-pass filter is applied to cut a high frequency component higher than or equal to the Nyquist frequency. Various kinds of reduction processing while reducing the occurrence of the moire by another known processing are disclosed. This embodiment only needs to reduce the occurrence of the moire at the time of the reduction processing during the processing flow of this embodiment and accordingly it is not limited to a simple low-pass filter, and processing considering the reduction of the occurrence of the moire at the time of the reduction may be performed before the reduction processing or the reduction processing considering the reduction of the occurrence of the moire at the time of the reduction may be performed.

FIG. 1A (A-2) illustrates an image (image of difference information) obtained by subtracting the image of FIG. 1A (B-1-1) from the image of FIG. 1A (A-1-1) as a reference image with respect to the pair of reduced parallax images. This image (difference image or difference information) contains a parallax component of an object and the unnecessary component described above as a difference of the pair of parallax images. However, when the object is located at a far distance obtained by capturing the landscape as illustrated in FIG. 1A, an amount of the parallax component of the object is a tiny amount and accordingly the influence can be substantially ignored. Similarly, FIG. 1A (B-2) is an image obtained by subtracting the image of FIG. 1A (A-1-1) from the image of FIG. 1A (B-1-1) as a reference image with respect to the pair of parallax images. While the unnecessary component contained in the image of FIG. 1A (A-1-1) is calculated as negative values by the difference calculation described above, for simplifying unnecessary component reduction processing at the latter stage, the negative values are truncated in the image of FIG. 1A (B-2). Accordingly, the difference image of FIG. 1A (B-2) indicates only the unnecessary components contained in the image of FIG. 1A (B-1-1) (in this example, any unnecessary component is not extracted from the image of FIG. 1A (B-2) since the image of FIG. 1A (B-1) does not originally contain the unnecessary component). As described above, by performing processing of maintaining (that is, separating or extracting) the unnecessary component in the difference image, the unnecessary component can be determined. In this embodiment, for easy descriptions, "truncating negative values" is described, and alternatively the truncation processing may be performed if a value in the image is below a certain threshold value provided by reduction processing of a base noise or offset processing of brightness. It is possible to proceed with the calculation in the calculation process even when the value is negative, and accordingly the negative value can be held as a value without being truncated. The negative value (or a value less than or equal to a certain threshold value) of the pixel value due to the application of the difference only needs to be recognized at a subsequent step. This is true in the following embodiments.

Then, correction processing of removing or reducing the unnecessary component determined as described above is performed on an image to be output. Specifically, processing of subtracting the unnecessary component from each of the parallax images of FIG. 1A (A-1) and FIG. 1A (B-1) is performed. However, since the size of each of the images of FIG. 1A (A-2) and FIG. 1A (B-2) is reduced, it is necessary to restore the size to a size of the image on which the reduction processing is not performed (i.e., original image size that is the same as that of each of the images of FIG. 1A (A-1) and FIG. 1A (B-1)). The images of FIG. 1A (A-3) and FIG. 1A (B-3) illustrate results of magnification processing to restore the reduced size to the original image size. The magnification processing may be simply performed by a proportional magnification, and it is preferred that interpolation processing such as a bilinear method and a bicubic method is performed. As a result, an occurrence of an abrupt edge step can be avoided and a high quality can be maintained even after unnecessary component reduction processing.

FIG. 1A (A-4) is a result of subtracting the image of FIG. 1A (A-3) from the image of FIG. 1A (A-1). FIG. 1A (B-4) is a result of subtracting the image of FIG. 1A (B-3) from the image of FIG. 1A (B-1). In this manner, each parallax image in which the unnecessary component is generally vanished (substantially removed) can be obtained. By synthesizing (combining) each of the parallax images (images of FIG. 1A (A-4) and FIG. 1A (B-4)) in which the unnecessary component has been reduced, a captured image that is generated by imaging without a pupil division as illustrated in FIG. 2B and that is equivalent to an image having the reduced unnecessary component can be generated.

In this embodiment, a difference image (difference image in which negative values are indicated as zero) between each of the parallax images is calculated with reference to one parallax image for the difference information, but this embodiment is not limited thereto. When the number of parallaxes is two as described in this embodiment, absolute values obtained by subtracting the image of FIG. 1A (B-1-1) from the image of FIG. 1A (A-1-1) as a reference image may be stored as the difference information (absolute difference information considering negative values as well). Then, by subtracting the absolute difference information from an image obtained by adding the image of FIG. 1A (A-1-1) to the image of FIG. 1A (B-1-1), a result equivalent to that described above is obtained.

Specifically, representing parallax images A and B simply as A and B, respectively, expression (1) below is satisfied.

$$(A-B)_0 + (B-A)_0 = |A-B| \quad (1)$$

In expression (1), symbol $(\ )_0$ means that negative values, if any, are truncated to be zero with respect to a result of calculation of formula in parentheses. As described above, the difference information can be stored as the absolute difference information, and for example a method which is capable of performing the processing at higher speed may be used.

Subsequently, referring to FIG. 1B, a method of determining the unnecessary component by using the absolute difference information described above and further removing or reducing the unnecessary component will be described.

FIG. 1B (C-1) and FIG. 1B (D-1) illustrate the same images as those of FIG. 1A (A-1) and FIG. 1A (B-1) described above, respectively. FIG. 1B (C-1) and FIG. 1B (D-1) illustrate a pair of parallax images obtained as results of photoelectric conversion of light beams passing through regions P1 and P2 (pupil regions) by the pixel groups G1 and G2, respectively. In this embodiment, for easy understanding, the parallax image obtained from the pixel group G1 and the parallax image obtained from the pixel group G2 are illustrated separately as FIG. 1B (C-1) and FIG. 1B (D-1), respectively. FIG. 1B (E-1) is an image obtained by averaging processing on the FIG. 1B (C-1) and FIG. 1B (D-1). The averaging processing is performed by adding pixel values of the images of FIG. 1B (C-1) and FIG. 1B (D-1) at each corresponding coordinate and then dividing the added pixel value by two to be obtained as a pixel value of the image of FIG. 1B (E-1) at each corresponding coordinate. FIG. 1B (E-1) is also an image which is equivalent to the image of FIG. 2A.

FIG. 1B (C-1-1) and FIG. 1B (D-1-1) are results of the reduction processing performed on the pair of parallax images illustrated in FIG. 1B (C-1) and FIG. 1B (D-1), respectively. FIG. 1B (C-2) is a result of absolute difference processing as indicated on the right side of expression (1) which is performed on the pair of reduced parallax images, i.e., the images of FIG. 1B (C-1-1) and FIG. 1B (D-1-1). This image (difference information or absolute difference information) contains a parallax component of an object and the unnecessary component described above as a difference of the pair of parallax images. However, when the object is located at a far distance obtained by capturing the landscape as illustrated in FIG. 1B, an amount of the parallax component of the object is a tiny amount and accordingly the influence can be substantially ignored.

FIG. 1B (C-3) illustrates a result of magnification processing performed to restore a size of the image to an original size. FIG. 1B (C-4) is a result of subtracting the image of FIG. 1B (C-3) from the image of FIG. 1B (E-1). Thus, each parallax image in which the unnecessary component is generally vanished (removed) can be obtained even when the absolute difference information is used. This is true in Embodiment 2 described below.

As described above, it is necessary to perform difference calculation between images in these processing steps, and also it is necessary to perform the difference calculation a plurality of times if the unnecessary component reduction processing is included. In this case, a large memory capacitance is needed as a buffer that temporarily stores the difference result and the processing load increases depending on a data amount of a plurality of images. However, by performing the reduction processing described above, a difference calculation region can be narrowed and also the processing load can be reduced. Since an area of the unnecessary component targeted in this embodiment is large to some extent, an effect can be maintained even if the reduction processing is performed with a strong reduction rate of 1/10 on a high-definition image which has an original image size exceeding 2000 pixels in a longitudinal direction. Accordingly, by performing the reduction processing, the reduction of a large amount of the processing load can be expected.

Furthermore, by performing the reduction processing, a noise reduction effect can be achieved. If the reduction and magnification processing of this embodiment is not performed, a noise may be increased by performing the reduction processing on the unnecessary component, compared to a noise contained in an original parallax image. This is because a noise amount and a noise pattern are different between the obtained parallax images. Referring to FIGS. 8A to 8H, a phenomenon of the increase of the noise will be described briefly. FIGS. 8A to 8H are explanatory diagrams of a noise amount when the reduction processing is not performed.

FIGS. 8A and 8B are diagrams of illustrating an extracted part (10×10 pixels) having the same coordinate of the parallax images obtained by capturing a gray homogeneous object. Actually, while there are three channels of RGB, for easy descriptions, pixel values of G is only illustrated by an example. The image pickup system has a form as illustrated in FIG. 4, and it is a system which is capable of obtaining two parallax images by dividing light into two lights to be input to the pixels G1 and G2, while the light is to be collected into one pixel if an image pickup system which does not perform the pupil division is used. Pixel values obtained by the pixels G1 and G2 may be added to each other if an image equivalent to the captured image generated by imaging with the pupil division needs to be obtained.

For example, in FIGS. 8A to 8H, FIG. 8A illustrates pixel values obtained by the pixels G1, and FIG. 8B illustrates pixel values obtained by the pixels G2. Since a flat object with a uniform luminance which exists on an in-focus plane is captured, the parallax component can be ignored. In each of FIGS. 8A and 8B, the pixel values have variations at a certain rate despite capturing the object with the uniform luminance due to the influence of a noise that occurs in the image pickup element. In this case, an average of the pixel values in a range of 10×10 pixels in FIG. 8A is 62.6, and a standard deviation indicating the degree of variation is 2.98. An average of the pixel values in a range of 10×10 pixels in FIG. 8B is 62.6, and a standard deviation indicating the degree of variation is 2.17. This example is a simple model for describing a behavior of the noise, and accordingly, any unnecessary component (ghost component) to be reduced is not depicted.

FIG. 8C is a diagram of illustrating values obtained by adding numerical values at the same coordinates in FIGS. 8A and 8B, and it corresponds to "the captured image generated by imaging without the pupil division" described above. In this case, the average of the pixel values is 125.1 and the standard deviation is 3.91. FIGS. 8D and 8E illustrate results of performing "the determination processing of the unnecessary component" described above. Specifically, FIG. 8D is a result of subtracting values of FIG. 8B from values of FIG. 8A at the same coordinates, and FIG. 8E is a result of subtracting the values of FIG. 8A from the values of FIG. 8B at the same coordinates. With respect to the coordinate at which the numerical value is negative during the difference calculation, the numerical value at the coordinate is replaced with zero.

FIGS. 8F and 8G illustrate results of performing "the reduction processing of the unnecessary component" described above. Specifically, FIG. 8F is a result of subtracting an unnecessary component image (FIG. 8D) from an original parallax image (FIG. 8A), and FIG. 8G is a result of subtracting an unnecessary component image (FIG. 8E) from an original parallax image (FIG. 8B). FIG. 8H is a result of adding numerical values at the same coordinates in FIGS. 8F and 8G. FIG. 8H is a final "image obtained by reducing the unnecessary component". As described above, since the negative values are truncated to be replaced with zero in the first process of the application of the difference (FIGS. 8D and 8E), the image (FIGS. 8F and 8G) obtained by performing the reduction processing of the unnecessary component is certainly darker than an original parallax image. With respect to a noise component, there are a lot of pixels at which noise components are increased by the reduction processing of the unnecessary component while the noise components are decreased at some pixels, and therefore, totally the standard deviation in FIG. 8H is larger than that in FIG. 8C. There is a solution to decrease the value of the standard deviation in "the image obtained by the reduction processing of the unnecessary component" compared to "the captured image generated by imaging without the pupil division". However, as the size of the image increases, the probability of reducing the noise in "the captured image generated by imaging without the pupil division" in its entirety is extremely low. Since "the image obtained by performing the reduction processing of the unnecessary component" is created by the difference calculation as described above, there is extremely high possibility that a difference between a maximum value and a minimum value of an amplification of the noise increases compared to "the captured image generated by imaging without the pupil division", and accordingly the noise appears to increase.

For the reasons above, a noise amount increases in "an image obtained by performing reduction processing of an unnecessary component" compared to "a captured image generated by imaging without pupil division", and accordingly an image quality may be deteriorated.

Next, referring to FIG. 9, the image processing method (determination processing of the unnecessary component and reduction processing of the unnecessary component) in this embodiment will be described. FIG. 9 is a flowchart of illustrating the image processing method. Each step in FIG. 9 is performed by the system controller 210 or the image processor 204 according to an image processing program as a computer program.

First, at step S11, the system controller 210 controls an image pickup device that is constituted by the optical system 201 and the image pickup element 202 to photograph (capture) an object. The image processor 204 acquires a captured image as an input image.

Subsequently, at step S12, the image processor 204 generates a pair of parallax images by using digital signals which are output from the image pickup element 202 (pixel groups G1 and G2) and are obtained by the A/D conversion of the A/D converter 203. In this embodiment, the image processor 204 may perform typical development processing and various kinds of image correction processing to generate the parallax images. Furthermore, at step S12, parallax images can be generated as separated images like "an image obtained only by the pixel group G1" and "an image obtained only by the pixel group G2", or alternatively one image in which the pixel groups G1 and G2 are mixed may be obtained. The pixel groups and the corresponding parallax images only have to be recognized.

Subsequently, at step S13, the image processor 204 (reduction processor 204b) performs the reduction processing on the parallax images generated at step S12. The reduction rate for the reduction processing is appropriately set according to an original size of the parallax images. In this case, the unnecessary component to be reduced only needs to remain after the reduction processing, and accordingly the size of the parallax images can be reduced to around 1/10 of the original size if an area of the unnecessary component is sufficiently large. Also in this case, parallax images generated as separated images can be reduced, or alternatively one image in which parallaxes are mixed may be reduced. By reducing the images, the quality of an unnecessary component reduction image to be finally output can be improved because of the effect of the noise reduction in which the noise is smoothened as described above in addition to the reduction of the processing load. A smoother (not illustrated) may be provided in the reduction processor 204b to perform low-pass filter processing according to the reduction rate to prevent an occurrence of moire during the reduction processing between steps S12 and S13.

Subsequently, at step S14, the image processor 204 (unnecessary component detector 204a) obtains difference information of the pair of parallax images. In other words, the image processor 204 generates a difference image (FIG. 1A (A-2)) obtained by using an image of FIG. 1A (A-1-1) as a reference image, and a difference image (FIG. 1A (B-2)) obtained by using an image of FIG. 1A (B-1-1) as a reference image. When unnecessary lights reaching the imaging plane pass through pupil regions different from each other in the optical system, as illustrated in FIG. 1A (A-1) and FIG. 1A (B-1), whether the unnecessary component occurs or not, or the position of the occurrence of the unnecessary component is different for each parallax image. Therefore, in a simple difference image, a difference value of the unnecessary component indicates positive or negative values. For example, in this embodiment, when the image of FIG. 1A (B-1-1) is subtracted from the image of FIG. 1A (A-1-1) to generate the difference image (FIG. 1A (A-2)), the unnecessary component contained in the image of FIG. 1A (A-1-1) indicates positive values, and on the other hand, the unnecessary component contained in the image of FIG. 1A (B-1-1) indicates negative values.

In this embodiment, for simplifying the unnecessary component reduction processing described below, processing of truncating the negative values to zero is performed. Accordingly, in FIG. 1A (A-2), only the unnecessary component contained in the image of FIG. 1A (A-1-1) is detected as positive values. By performing similar processing on the difference image of FIG. 1A (B-2), in FIG. 1A (B-2), only the unnecessary component contained in the image of FIG. 1A (B-1-1) is detected as positive values. When difference information is obtained with respect to an image including a close-range object, processing to align the positions of the pair of parallax images may be performed in order to remove an object parallax component. The alignment can be performed by determining a shift position at which a correlation between the parallax images is maximized while shifting a position of one of the parallax images relative to a position of the other of the parallax images. Alternatively, the alignment may be performed by determining the shift position at which the sum of squares of the difference between the parallax images is minimized. An in-focus area in the parallax image may be used to determine the shift position for the alignment. An edge detection may be previously performed in each of the parallax images to determine the shift position for the alignment using an image containing the detected edge. According to this method, an edge with a high contrast is detected in the in-focus area, and on the other hand an out-of-focus area such as a background has a low contrast and is not easily detected as an edge, and thus the shift position is inevitably determined with the in-focus area being emphasized. An equivalent result is obtained by using the absolute difference information as difference information.

Subsequently, at step S15, the image processor 204 (unnecessary component detector 204a) determines the component remaining in the difference image obtained at step S14 as an unnecessary component (unnecessary component information).

Subsequently, at step S16, the image processor (magnification processor 204c) performs magnification processing to restore the image size to an original image size. During the magnification processing, the magnification may be simply performed by a proportional magnification, and it is preferred that interpolation processing such as a bilinear method and a bicubic method is performed. As a result, an occurrence of an abrupt edge step can be avoided and a high quality can be maintained even when the unnecessary component is reduced at the latter step, and accordingly it is preferable. The result of the magnification processing corresponds to the images of FIG. 1A (A-3) and FIG. 1A (B-3).

Subsequently, at step S17, the image processor 204 (unnecessary component reducer 204d) performs correction processing of reducing (or removing) the unnecessary component from an image to be output. In this embodiment, as an image to be output, each parallax image which is obtained by treating the pixels G1 and G2 illustrated in FIG. 1A (A-4) and FIG. 1A (B-4) as one pixel is generated. In this case, by truncating the negative values to zero at step S14, only the unnecessary component contained in each parallax image is detected as positive values. Accordingly, by subtracting the difference image from each parallax image simply, the unnecessary component can be removed. In this embodiment, it corresponds to the subtraction of the difference image of FIG. 1A (A-3) from the parallax image of FIG. 1A (A-1) and the subtraction of the difference image of FIG. 1A (B-3) from the parallax image of FIG. 1A (B-1).

Finally, at step S18, the image processor 204 generates output images. Then, the system controller 210 stores the output images in which the unnecessary components have been removed (reduced) as illustrated in FIG. 1A (A-4) and FIG. 1A (B-4) in the image recording medium 209 or displays them on the display unit 205. An image which is equivalent to a captured image, which is illustrated in FIG. 2B and has a reduced unnecessary component, generated by photographing (imaging) without the pupil division can also be output by synthesizing each of the parallax images in which the unnecessary component (ghost component) has been removed.

In this embodiment, as a modification of the order of performing the reduction processing, as illustrated in FIG. 10, the reduction processing may be performed after the difference information is generated. FIG. 10 is a flowchart of illustrating the image processing method as a modification of this embodiment. The flowchart of FIG. 10 is different from the flowchart of FIG. 9 in that the reduction processing (step S13) is performed after the difference information is generated (step S14). In this case, the calculation processing load when determining the unnecessary component can be reduced and a fine noise component that occurs by the reduction processing can be reduced.

Figure 11:
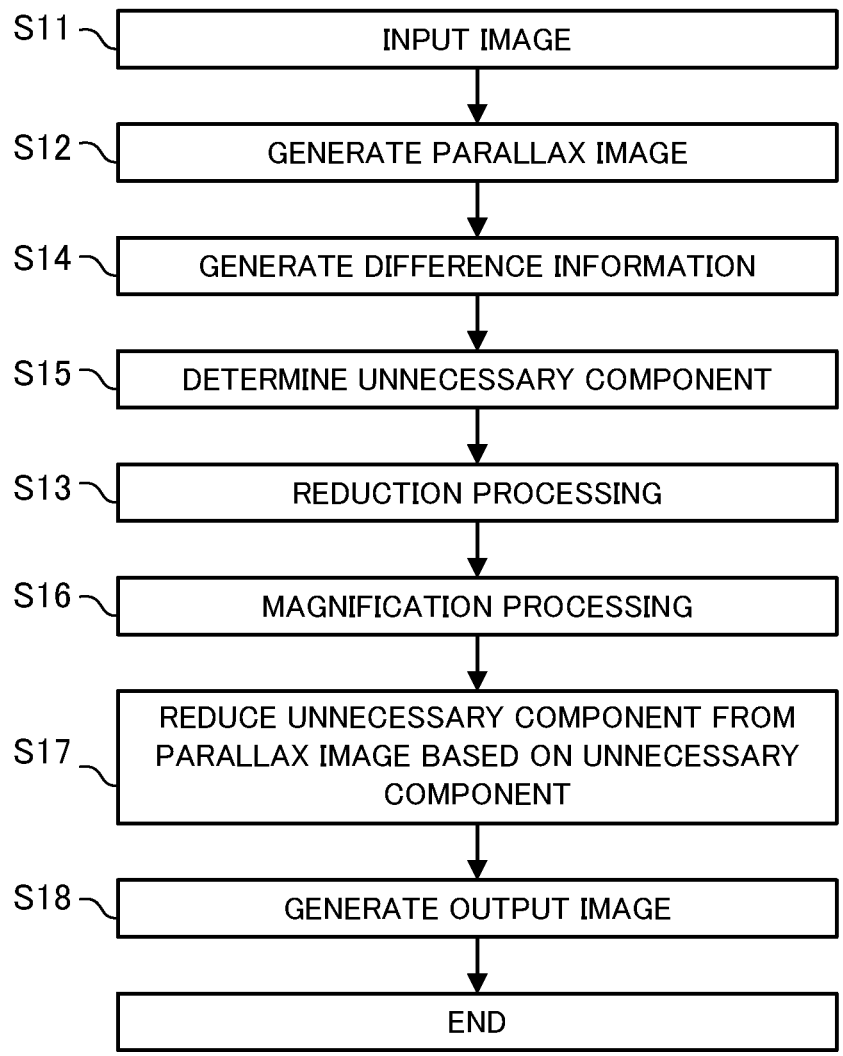
FIG. 11 is a flowchart of illustrating an image processing method in Embodiment 1.

As a further modification, as illustrated in FIG. 11, the reduction processing may be performed after the unnecessary component is determined. FIG. 11 is a flowchart of illustrating the image processing method as a further modification of this embodiment. The flowchart of FIG. 11 is different from the flowchart of FIG. 9 in that the reduction processing (step S13) is performed after the unnecessary component is determined (step S15). In this case, the magnification processing is performed immediately after the reduction processing and therefore the effect of reducing the calculation processing load cannot be expected, but a fine noise component occurring by the reduction processing can be reduced.

According to this embodiment, the calculation load amount in the image processing can be reduced when the unnecessary component formed by the unnecessary light (ghost) from the difference information based on a plurality of parallax images obtained by image capturing (i.e., image pickup) a plurality of times is determined. In addition, the high quality of an image can be maintained even when the determined unnecessary component is reduced or removed.

[Embodiment 2]

Figure 12:
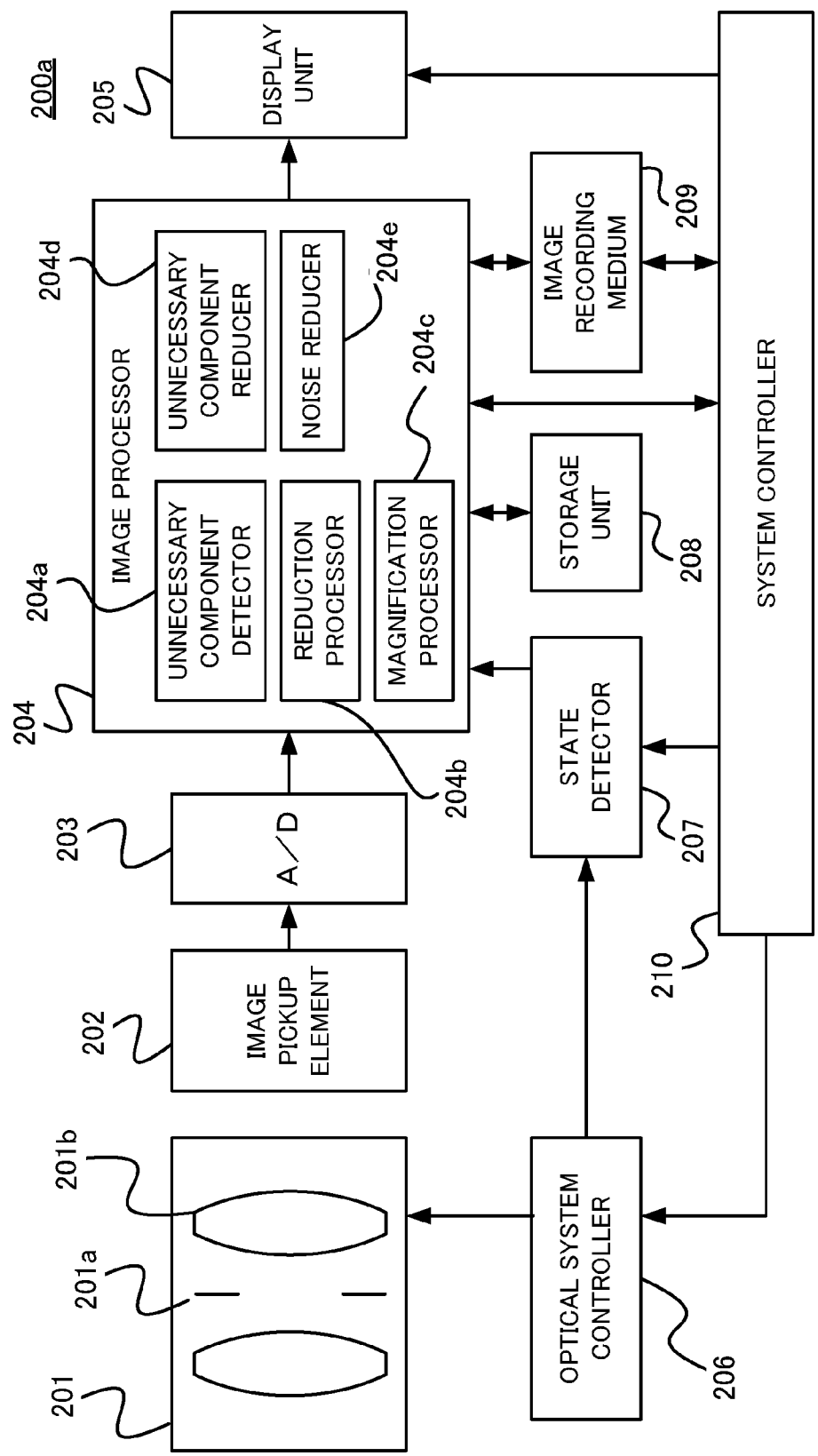
FIG. 12 is a block diagram of an image pickup apparatus in Embodiment 2.

Next, referring to FIG. 12, an image pickup apparatus in Embodiment 2 of the present invention will be described. FIG. 12 is a block diagram of an image pickup apparatus 200a which is capable of performing an image processing method in this embodiment. The image pickup apparatus 200a is different from the image pickup apparatus 200 of Embodiment 1 described referring to FIG. 5 in that the image processor 204 of this embodiment includes a noise reducer 204e to reduce a noise of an image. Other configurations are the same as those of the image pickup apparatus 200 in Embodiment 1, and accordingly descriptions thereof will be omitted.

Next, referring to FIG. 13, the image processing method in this embodiment will be described. FIG. 13 is a flowchart of illustrating the image processing method in this embodiment. Each step in FIG. 13 is performed by the system controller 210 or the image processor 204 according to an image processing program as a computer program. The image processing method of this embodiment is different from the image processing method of Embodiment 1 described referring to FIG. 9 in that a step (step S21) of performing smoothing processing is added. Other processing is the same as that of Embodiment 1, and accordingly descriptions thereof will be omitted.

In FIG. 13, steps S11 to S15 are the same as steps S11 to S15 in FIG. 9. Subsequently, at step S21, the image processor 204 (noise reducer 204e) performs the smoothing processing to reduce the noise of the unnecessary component obtained at step S15. As a method of the smoothing processing, a known method can be used, and it is preferred that a smoothing filter such as a bilateral filter to maintain an edge portion is used. This is because a negative effect such as a black level depression may occur at the edge portion when the difference processing of reducing the unnecessary component is performed at the latter step by using a filter such as Gaussian filter that provides a uniform blur. By performing the smoothing processing after the reduction processing is performed as described in this embodiment, the smoothing processing makes it possible to reduce a relatively large block noise or the like that cannot be sufficiently reduced by the reduction processing. In FIG. 13, subsequent steps S16 to S18 are the same as steps S16 to S18 in FIG. 9.

In this embodiment, as a modification of the order of performing the smoothing processing, as illustrated in FIG. 14, the reduction processing may be performed after the difference information is generated. FIG. 14 is a flowchart of illustrating the image processing method as a modification of this embodiment. The flowchart of FIG. 14 is different from the flowchart of FIG. 13 in that the smoothing processing (step S21) is performed after the difference information is generated (step S14). In this case, the number of images for on which the smoothing processing needs to be performed increases, but the effect of the noise reduction can be obtained similarly to the case of the flowchart in FIG. 13.

Figure 15:
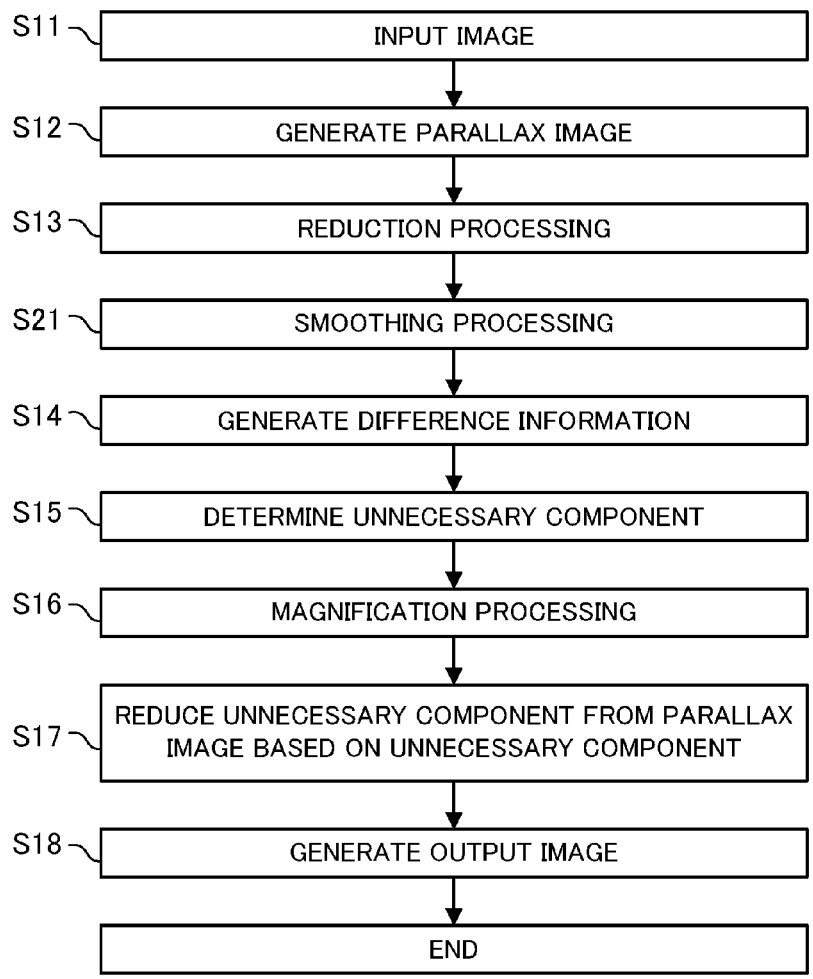
FIG. 15 is a flowchart of illustrating an image processing method in Embodiment 2.

As a further modification, as illustrated in FIG. 15, the smoothing processing may be performed before the difference information is generated. FIG. 15 is a flowchart of illustrating the image processing method as a further modification of this embodiment. The flowchart of FIG. 15 is different from the flowchart of FIG. 13 in that the smoothing processing (step S21) is performed before the difference information is generated (step S14). Also in this case, the effect of the noise reduction can be obtained similarly to the case of the flowchart in FIG. 13.

According to this embodiment, the calculation load amount in the image processing can be reduced when the unnecessary component formed by the unnecessary light (ghost) from the difference information based on a plurality of parallax images obtained by image capturing a plurality of times is determined. In addition, by further applying the smoothing processing, the high quality of an image can be maintained even when the determined unnecessary component is reduced or removed.

[Embodiment 3]

Next, Embodiment 3 (multiple pupil division) of the present invention will be described.

Figure 16:
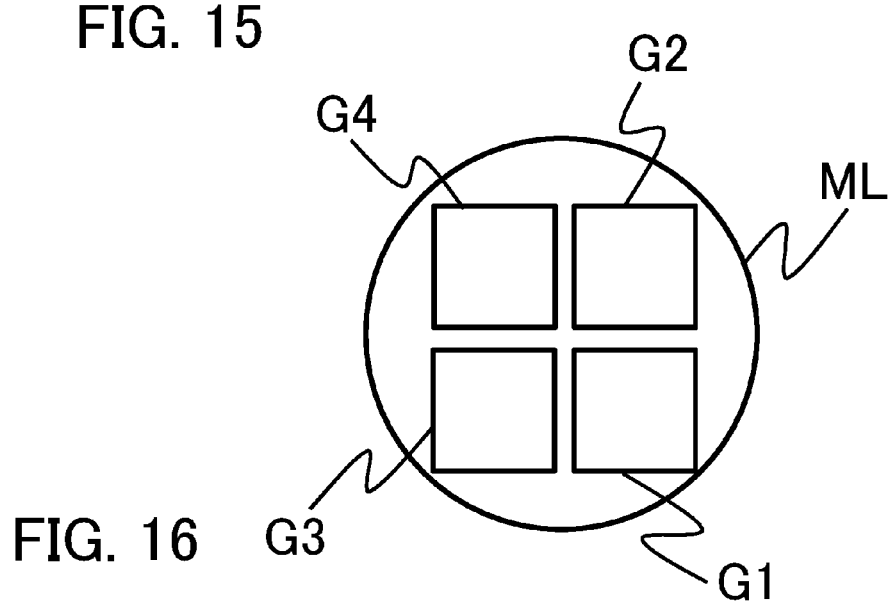
FIG. 16 is a diagram of illustrating an image pickup element in each of Embodiments 3 and 4.
Figure 17:
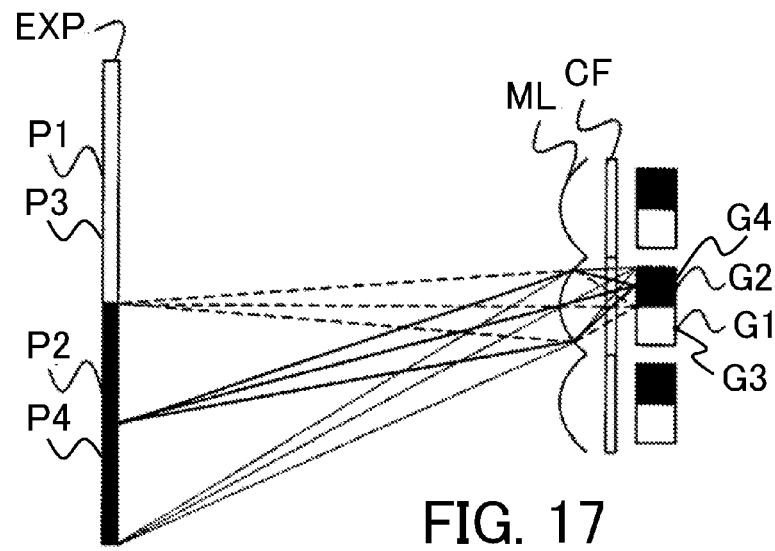
FIG. 17 is a relational diagram of a light-receiving portion of an image pickup element and a pupil of an optical system in an image pickup system in each of Embodiments 3 and 4.

FIG. 17 is a diagram of illustrating a relation between light-receiving portions of an image pickup element in an image pickup system and a pupil of an optical system. In FIG. 17, symbol ML represents a micro lens, and symbol CF represents a color filter. Symbol EXP represents an exit pupil of the optical system. Symbols G1, G2, G3, and G4 represent light-receiving portions (pixels G1, G2, G3, and G4), and one pixel G1, one pixel G2, one pixel G3, and one pixel G4 make a set (the pixels G1, G2, G3, and G4 are disposed to share a single micro lens ML). The image pickup element includes an array of a plurality of sets (pixel sets) of the pixels G1, G2, G3, and G4. The pixels G3 and G4 are disposed at the deep side of a paper surface of the pixels G1 and G2 in two dimensions, respectively (not illustrated). The set of pixels G1, G2, G3, and G4 have a conjugate relation with the exit pupil EXP via the shared (that is, provided for each pixel set) micro lens ML. The pixels G1 and G2 arrayed in the image pickup element are referred to as pixel groups G1 and G2, respectively (the same is true for each of the pixels G3 and G4). FIG. 16 is a diagram of the micro lens ML when seen from the exit pupil EXP.

Figure 18:
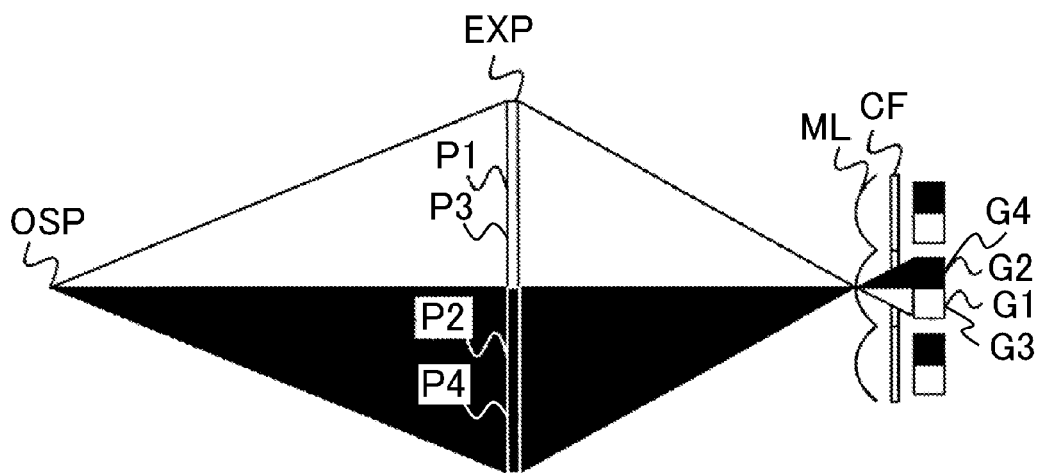
FIG. 18 is a schematic diagram of the image pickup system in Embodiment 3.
Figure 19:
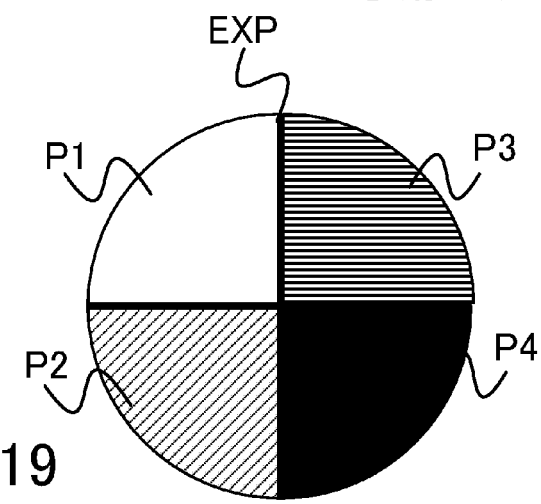
FIG. 19 is an explanatory diagram of unnecessary light passing through an aperture stop of the optical system in Embodiment 3.

FIG. 18 is a schematic diagram of the image pickup system in this embodiment, and it illustrates an imaging relation of an object point OSP for which image pickup is performed, the exit pupil EXP, and the image pickup element. The pixel G1 receives a light beam passing through a region P1 of the exit pupil EXP. The pixel G2 receives a light beam passing through a region P2 of the exit pupil EXP. The regions P3 and P4 are disposed at the deep side of a paper surface of the regions P1 and G2 in two dimensions, respectively (not illustrated). The object point OSP does not necessarily need to have an object located thereon, and a light beam passing through the object point OSP is incident on one of the pixel G1, the pixel G2, the pixel G3, and the pixel 4 depending on a region (position) in the pupil (exit pupil EXP) through which the light beam passes. Travelling of light beams through regions of the pupil that are different from each other corresponds to separation of incident light from the object point OSP by its angle (parallax). In other words, for each micro lens ML corresponding to the pixels G1, G2, G3, and G4, four images generated by using output signals from the pixels G1, G2, G3, and G4 are a plurality of parallax images having parallaxes with each other. FIG. 19 is a diagram of the exit pupil EXP when seen from the micro lens ML. In FIGS. 17 and 18, when the conjugate relation described above is not completely held due to, for example, a position shift of the exit pupil EXP, or when the regions P1 and P2 (or regions P3 and P4) partially overlap with each other, a plurality of obtained images are still treated as parallax images. The basic configuration of the image pickup apparatus which is capable of performing the image processing method and the optical system in this embodiment are the same as the image pickup apparatus 200a of Embodiment 2 described referring to FIG. 12 and the optical system 201 described referring to FIGS. 6A and 6B, respectively, and accordingly descriptions thereof will be omitted.

Figure 20:
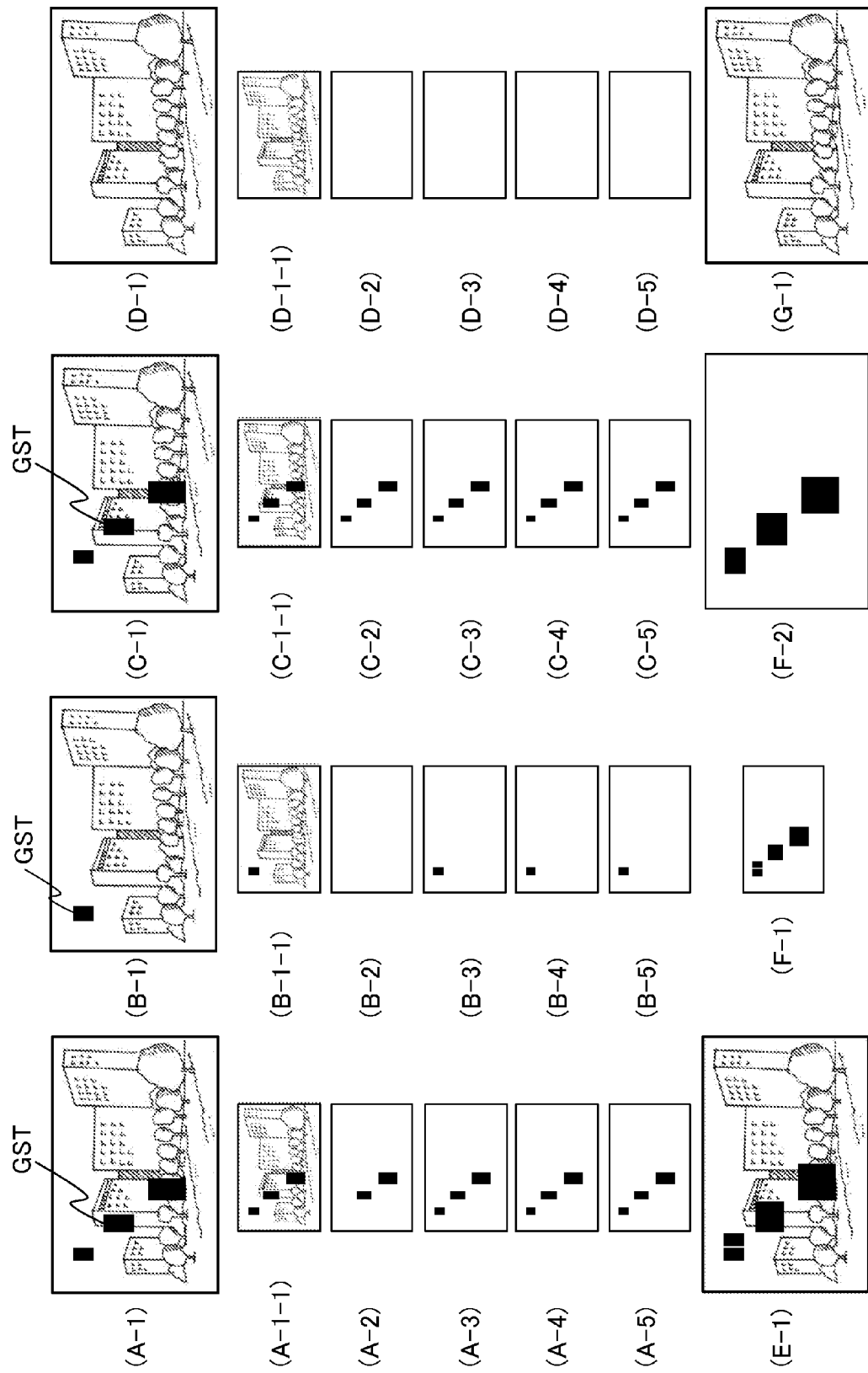
FIG. 20 is a diagram of illustrating a procedure of an image processing method in Embodiment 3.

Next, referring to FIG. 20, a method of determining an unnecessary component as an image component that appears through a photoelectric conversion of unnecessary light in a captured image generated by the image pickup apparatus 200a will be described. FIG. 20 are diagrams of illustrating a procedure of the image processing method in this embodiment. In this embodiment, the captured image generated by imaging without the pupil division is the same as that of FIG. 2.

FIG. 20 (A-1), FIG. 20 (B-1), FIG. 20 (C-1), and FIG. 20 (D-1) illustrate a set of parallax images obtained as a result of photoelectric conversion by pixel groups G1, G2, G3, and G4 where light beams passing through the pupil regions P1, P2, P3, and P4 are received, respectively. The set of parallax images contain unnecessary components GST schematically illustrated as black squares, and positions of parts (at the upper left) of the unnecessary components GST in FIG. 20 (A-1) and FIG. 20 (B-1) overlap at the same position. On the other hand, all positions of the unnecessary components are different from each other between FIG. 20 (A-1) and FIG. 20 (C-1). Any unnecessary component does not occur in FIG. 20 (D-1).

FIG. 20 (A-1-1), FIG. 20 (B-1-1), FIG. 20 (C-1-1), and FIG. 20 (D-1-1) are results of reduction processing performed on the respective parallax images. Smoothing processing such as low-pass filter processing may be performed to prevent the occurrence of moire as described in each of Embodiments 1 and 2 before the reduction processing is performed.

FIG. 20 (A-2) is an image of difference information obtained by subtracting the image of FIG. 20 (B-1-1) from the image of FIG. 20 (A-1-1) as a reference image with respect to the set of parallax images. Similarly to Embodiment 1, this image contains a parallax component of an object and the unnecessary component described above as the difference information. As described above, parts of the unnecessary components overlap with each other at the same position between the images of FIG. 20 (A-1) and FIG. 20 (B-1). Thus, the unnecessary components occurring at the same position do not appear in the difference image. In other words, there is an unnecessary component which is unable to be detected only by the difference information between two images. However, by acquiring a plurality of pieces of different information of parallax images as described in this embodiment, the unnecessary component can be effectively detected if the unnecessary component occurs at a position in at least one parallax image, for example as illustrated in FIG. 20 (C-1), different from a position in a reference image.

FIG. 20 (A-3) is a difference image obtained by subtracting the image of FIG. 20 (C-1-1) from the image of FIG. 20 (A-1-1) as a reference image with respect to the set of parallax images. Similarly to Embodiment 1, this image contains a parallax component of an object and the unnecessary component described above as the difference information. Similarly to Embodiment 1, while the unnecessary component contained in the image of FIG. 20 (C-1-1) is calculated as negative values by the difference calculation, for simplifying unnecessary component reduction processing at the latter stage, the negative values are truncated in the image of FIG. 20 (A-3). The same is true for all other difference images. Accordingly, the difference image of FIG. 20 (A-3) indicates only the unnecessary components contained in the image of FIG. 20 (A-1-1).

FIG. 20 (A-4) is a difference image obtained by subtracting the image of FIG. 20 (D-1-1) from the image of FIG. 20 (A-1-1) as a reference image with respect to the set of parallax images. Since the images of FIG. 20 (A-1-1) and FIG. 20 (D-1-1) are different in the presence or absence of the unnecessary component, similarly to the image of FIG. 20 (A-3), the image of FIG. 20 (A-4) indicates only the unnecessary components contained in the image of FIG. 20 (A-1-1).

FIG. 20 (A-5) is information (maximum difference information or maximum difference image) obtained by extracting a maximum value between difference information at each pixel position in the difference images of FIG. 20 (A-2), FIG. 20 (A-3), and FIG. 20 (A-4) as difference information acquired as two-dimensional data. In this embodiment, the image information has a value equivalent to that of each of the images of FIG. 20 (A-3) and FIG. 20 (A-4), and it corresponds to a position and an amount of the unnecessary component contained in the image of FIG. 20 (A-1-1).

Similarly, FIG. 20 (B-2) is a difference image obtained by subtracting the image of FIG. 20 (A-1-1) from the image of FIG. 20 (B-1-1) as a reference image with respect to the set of parallax images. FIG. 20 (B-3) is a difference image obtained by subtracting the image of FIG. 20 (C-1-1) from the image of FIG. 20 (B-1-1) as the reference image with respect to the set of parallax images. FIG. 20 (B-4) is a difference image obtained by subtracting the image of FIG. 20 (D-1-1) from the image of FIG. 20 (B-1-1) as the reference image with respect to the set of parallax images. FIG. 20 (B-5) is the maximum difference information obtained by extracting a maximum value of the difference information at each pixel position in the difference images of FIG. 20 (B-2), FIG. 20 (B-3), and FIG. 20 (B-4) as difference information acquired as two-dimensional data. In this embodiment, the image information has values equivalent to values in each of the images of FIG. 20 (B-3) and FIG. 20 (B-4), and it includes a position and an amount of the unnecessary component contained in the image of FIG. 20 (B-1-1).

Similarly, FIG. 20 (C-2) is a difference image obtained by subtracting the image of FIG. 20 (A-1-1) from the image of FIG. 20 (C-1-1) as a reference image with respect to the set of parallax images. FIG. 20 (C-3) is a difference image obtained by subtracting the image of FIG. 20 (B-1-1) from the image of FIG. 20 (C-1-1) as the reference image with respect to the set of parallax images. FIG. 20 (C-4) is a difference image obtained by subtracting the image of FIG. 20 (D-1-1) from the image of FIG. 20 (C-1-1) as the reference image with respect to the set of parallax images. FIG. 20 (C-5) is maximum difference information obtained by extracting a maximum value of the difference information at each pixel position in difference images of FIG. 20 (C-2), FIG. 20 (C-3), and FIG. 20 (C-4) as difference information acquired as two-dimensional data. In this embodiment, the image information has values equivalent to values in each of the images of FIG. 20 (C-2), FIG. 20 (C-3), and FIG. 20 (C-4), and it includes a position and an amount of the unnecessary component contained in the image of FIG. 20 (C-1-1).

Similarly, FIG. 20 (D-2) is a difference image obtained by subtracting the image of FIG. 20 (A-1-1) from the image of FIG. 20 (D-1-1) as a reference image with respect to the set of parallax images. FIG. 20 (D-3) is a difference image obtained by subtracting the image of FIG. 20 (B-1-1) from the image of FIG. 20 (D-1-1) as the reference image with respect to the set of parallax images. FIG. 20 (D-4) is a difference image obtained by subtracting the image of FIG. 20 (C-1-1) from the image of FIG. 20 (D-1-1) as the reference image with respect to the set of parallax images. FIG. 20 (D-5) is maximum difference information obtained by extracting a maximum value of the difference information at each pixel position in difference images of FIG. 20 (D-2), FIG. 20 (D-3), and FIG. 20 (D-4) as difference information acquired as two-dimensional data. In this embodiment, the image information has values equivalent to values in each of the images of FIG. 20 (D-2), FIG. 20 (D-3), and FIG. 20 (D-4), and nothing is detected since any unnecessary component is not detected in the image of FIG. 20 (D-1-1).

Next, each of the images of FIG. 20 (A-5), FIG. 20 (B-5), FIG. 20 (C-5), and FIG. 20 (D-5) are synthesized (combined). FIG. 20 (F-1) is a result of smoothing processing performed on the synthesized image. FIG. 20 (F-2) is a result of further performing magnification processing to restore the image size to an original image size that corresponds to a size of an image acquired before the reduction processing is performed. Then, correction processing of removing or reducing the unnecessary component (or synthesized unnecessary component which is obtained by synthesizing unnecessary components of the respective parallax images) determined as described above is performed on an image to be output. Accordingly, as illustrated in FIG. 20 (G-1), each parallax image in which the unnecessary component has been generally vanished (removed) can be obtained. Specifically, a synthesized image (FIG. 20 (E-1)) obtained by synthesizing each of the parallax images of FIG. 20 (A-1), FIG. 20 (B-1), FIG. 20 (C-1), and FIG. 20 (D-1) is prepared, and then the image (synthesized unnecessary component) of FIG. 20 (F-2) is subtracted from the synthesized image of FIG. 20 (E-1). As a result, an image which is equivalent to a captured image, which is illustrated in FIG. 2B and has a reduced unnecessary component, generated by photographing without the pupil division can be generated.

Figure 21:
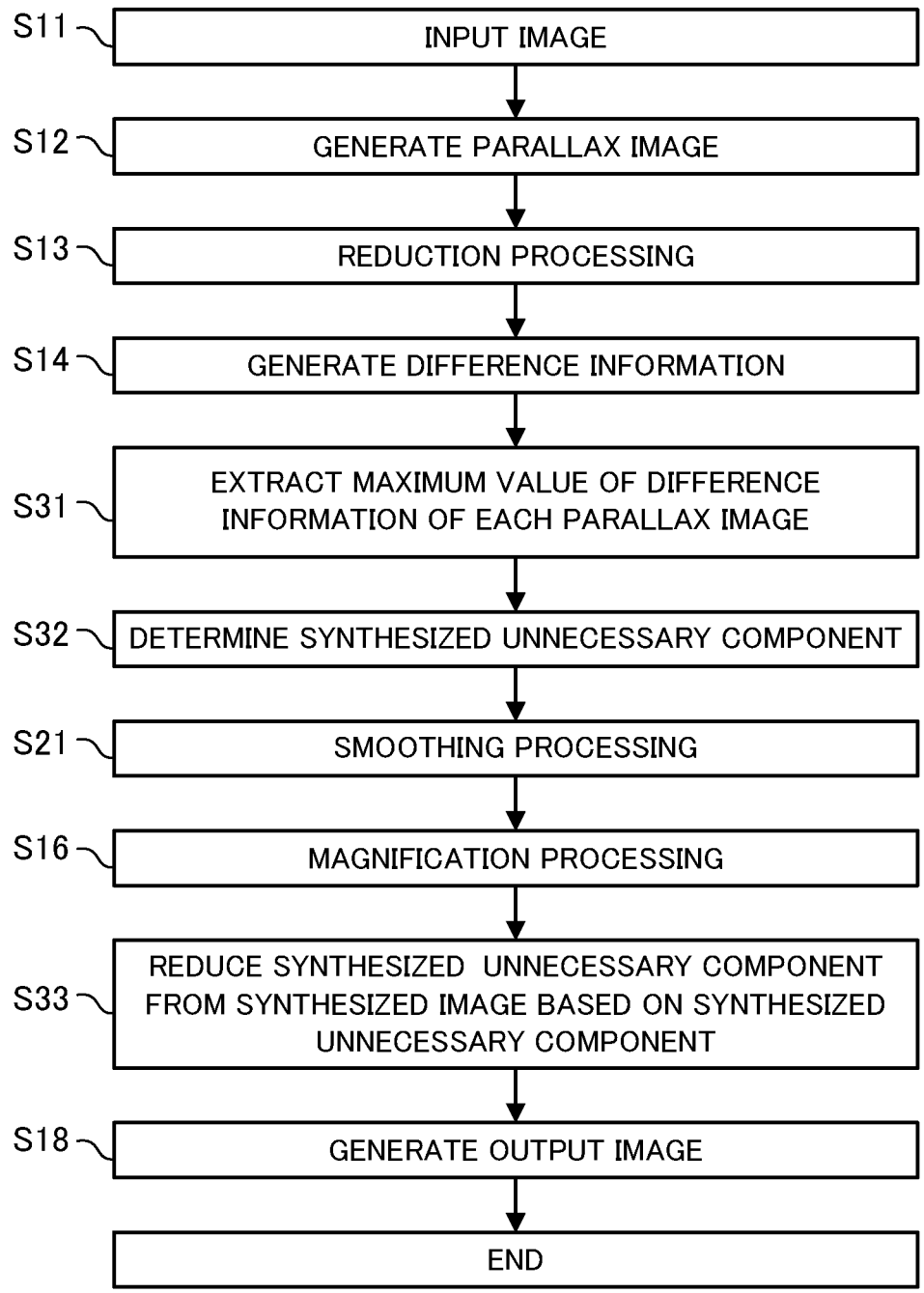
FIG. 21 is a flowchart of illustrating an image processing method in Embodiment 3.

Next, referring to FIG. 21, an image processing method in this embodiment will be described. FIG. 21 is a flowchart of illustrating the image processing method in this embodiment. Each step in FIG. 21 is performed by the system controller 210 or the image processor 204 according to an image processing program as a computer program. The image processing method of this embodiment is different from the image processing method of Embodiment 2 described referring to FIG. 13 in that a step (step S31) of extracting a maximum value of difference information of each parallax image is added. Other processing is the same as that of Embodiment 2, and accordingly descriptions thereof will be omitted.

In FIG. 21, steps S11 to S13 are the same as steps S11 to S13 in FIG. 13. Subsequently, at step S14, the image processor 204 (unnecessary component detector 204a) obtains difference information, which is obtained by using each parallax image as a reference image with respect to a set of parallax images. In other words, difference images of FIG. 20 (A-2), FIG. 20 (A-3), and FIG. 20 (A-4) are generated by using an image of FIG. 20 (A-1-1) as the reference image. Similarly, the image processor 204 generates difference images of FIG. (B-2), FIG. 20 (B-3), and FIG. 20 (B-4) by using an image of FIG. 20 (B-1-1) as the reference image. The image processor 204 also generates difference images of FIG. 20 (C-2), FIG. 20 (C-3), and FIG. 20 (C-4) by using an image of FIG. 20 (C-1-1) as the reference image. Furthermore, the image processor 204 generates difference images of FIG. 20 (D-2), FIG. 20 (D-3), and FIG. 20 (D-4) by using an image of FIG. 20 (D-1-1) as the reference image.

When unnecessary lights reaching the imaging plane pass through pupil regions different from each other in the optical system, as illustrated in FIG. 20 (A-1) and FIG. 20 (C-1), a position of the occurrence of the unnecessary component is different for each parallax image. Accordingly, in a simple difference image, difference values of the unnecessary component indicates positive and negative values. For example, in this embodiment, when the image of FIG. 20 (A-1-1) is subtracted from the image of FIG. 20 (C-1-1) used for generating the difference image of FIG. 20 (C-2), the unnecessary component contained in the image of FIG. 20 (A-1-1) indicates negative values. In this embodiment, for simplifying the unnecessary component reduction processing described below, processing of truncating the negative values to zero is performed. Accordingly, only the unnecessary component contained in the image of FIG. 20 (C-1-1) is detected as positive values. By performing similar processing on each difference image, only the unnecessary component contained in each reference image is detected as positive values. On the other hand, if the unnecessary component is not generated as illustrated in FIG. 20 (D-1-1), the unnecessary component is not detected in the difference information.

Subsequently, at step S31, the image processor 204 (unnecessary component detector 204a) extracts a maximum value of the difference information at each pixel position in the difference image obtained by using each parallax image obtained at step S14 as a reference image. Hereinafter, an effect of extracting the maximum value between a plurality of pieces of difference information will be described. As described in this embodiment, with respect to the images of FIG. 20 (A-1) and FIG. 20 (B-1), parts of the unnecessary components overlap with each other at the same position. Thus, there is a possibility that the unnecessary component occurs at the same position in parallax images depending on the optical system or a position of a high-luminance light source. In this case, the unnecessary component indicates a value of zero when the difference between these two images is calculated. In other words, there is an unnecessary component which is unable to be detected only by the difference information between two images. In this embodiment, by acquiring a plurality of pieces of different information of the parallax images, the unnecessary component can be effectively detected as illustrated in FIG. 20 (B-3) if the unnecessary component occurs at a position in at least one parallax image, for example as illustrated in FIG. 20 (C-1), different from a position in a reference image. Thus, by acquiring the plurality of pieces of difference information to extract maximum difference information between the plurality of pieces of difference information, a position and an amount of the unnecessary component can be definitely detected if there is at least one image in which positions of the unnecessary component are different between the parallax images.

Subsequently, at step S32, the image processor 204 (unnecessary component detector 204a) determines the component remaining in the maximum difference image obtained at step S31 as the unnecessary component (synthesized unnecessary component). By inserting the step of synthesizing images to one image as illustrated in FIG. 20 (F-1), which corresponds to the unnecessary component (synthesized unnecessary component), processing at the latter stage can be performed on one synthesized image. Accordingly, the processing load can be further reduced and thus it is more preferable.

Subsequently, at step S21, the image processor 204 (noise reducer 204e) performs smoothing processing on the maximum difference image obtained at step S31 or the synthesized image (corresponding to the image of FIG. 20 (F-1)). The smoothing processing is the same as that of Embodiment 2, and thus descriptions thereof will be omitted.

Subsequently, at step S16, the image processor 204 (magnification processor 204c) performs magnification processing to restore the reduced image size to an original image size that corresponds to a size obtained before the reduction processing is performed. During the magnification processing, the magnification may be simply performed by a proportional magnification, and it is preferred that interpolation processing such as a bilinear method and a bicubic method is performed. As a result, an occurrence of an abrupt edge step can be avoided and a high quality can be maintained even when the unnecessary component is reduced at the latter step, and accordingly it is preferable.

Subsequently, at step S33, the image processor 204 (unnecessary component reducer 204d) performs correction processing of reducing (or removing) the unnecessary component (synthesized unnecessary component obtained by synthesizing the plurality of parallax images) from the image to be output. Then, as illustrated in FIG. 20 (A-5), FIG. 20 (B-5), FIG. 20 (C-5), and FIG. 20 (D-5), each parallax image obtained by treating each of the pixels G1, G2, G3, and G4 as one pixel is generated as the image to be output. In this case, by truncating the negative values to zero at step S14, only the unnecessary component contained in each parallax image is detected as positive values. Therefore, by subtracting each of the difference images from each parallax image simply, the unnecessary component can be removed. In this embodiment, for example, it corresponds to subtracting the maximum difference image of FIG. 20 (A-5) from the parallax image of FIG. 20 (A-1). In this case, however, it is necessary to perform the difference calculation four times by subtracting the maximum difference image of FIG. 20 (B-5) from the parallax image of FIG. 20 (B-1) and the like. Accordingly, it is preferred that, first, the synthesized image of FIG. 20 (E-1) obtained by synthesizing the images of FIG. 20 (A-1), FIG. 20 (B-1), FIG. 20 (C-1), and FIG. 20 (D-1) are prepared, and then the image (synthesized unnecessary component) of FIG. 20 (F-1) obtained by synthesizing the images of FIG. 20 (A-5), FIG. 20 (B-5), FIG. 20 (C-5), and FIG. 20 (D-5) is subtracted from the synthesized image of FIG. 20 (E-1) as described above. By preparing the image of FIG. 20 (F-1), the smoothing processing and the magnification processing can be performed only on one image of FIG. 20 (F-1) and accordingly the processing load can be reduced.

Finally, at step S18, the image processor 204 generates output images. Then, the system controller 210 stores the output images in which the unnecessary components have been removed (reduced) as illustrated in FIG. 20 (G-1) in the image recording medium 209 or displays them on the display unit 205. An image which is equivalent to a captured image, which is illustrated in FIG. 2B, containing a reduced unnecessary component and generated by photographing without the pupil division can also be output by synthesizing each of the parallax images in which the unnecessary component has been removed. As a modification of this embodiment, the modification described in each of Embodiments 1 and 2 can also be applied.

According to this embodiment, the calculation load amount in the image processing can be reduced when the unnecessary component formed by the unnecessary light (ghost) from the difference information based on a plurality of parallax images obtained by image capturing a plurality of times is determined. Furthermore, by applying the smoothing processing in addition to the reduction processing, the high quality of an image can be maintained even when the determined unnecessary component is reduced or removed.

[Embodiment 4]

Next, Embodiment 4 of the present invention will be described. In this embodiment, a basic configuration of an image pickup apparatus is the same as that of the image pickup apparatus 200a of Embodiment 2 described referring to FIG. 12, and accordingly descriptions thereof will be omitted. A light-receiving portion of an image pickup element in an image pickup system is the same as that in Embodiment 3, and accordingly descriptions thereof will be omitted. A specific configuration of an optical system is the same as that of the optical system 201 in Embodiment 1 described referring to FIGS. 6A and 6B, and accordingly descriptions thereof will be omitted. A relation between regions P1, P2, P3, and P4 (pupil regions) through which light beams incident on an aperture stop STP and pixels G1, G2, G3, and G4 pass is the same as that of Embodiment 3, and accordingly descriptions thereof will be omitted.

Figure 22:
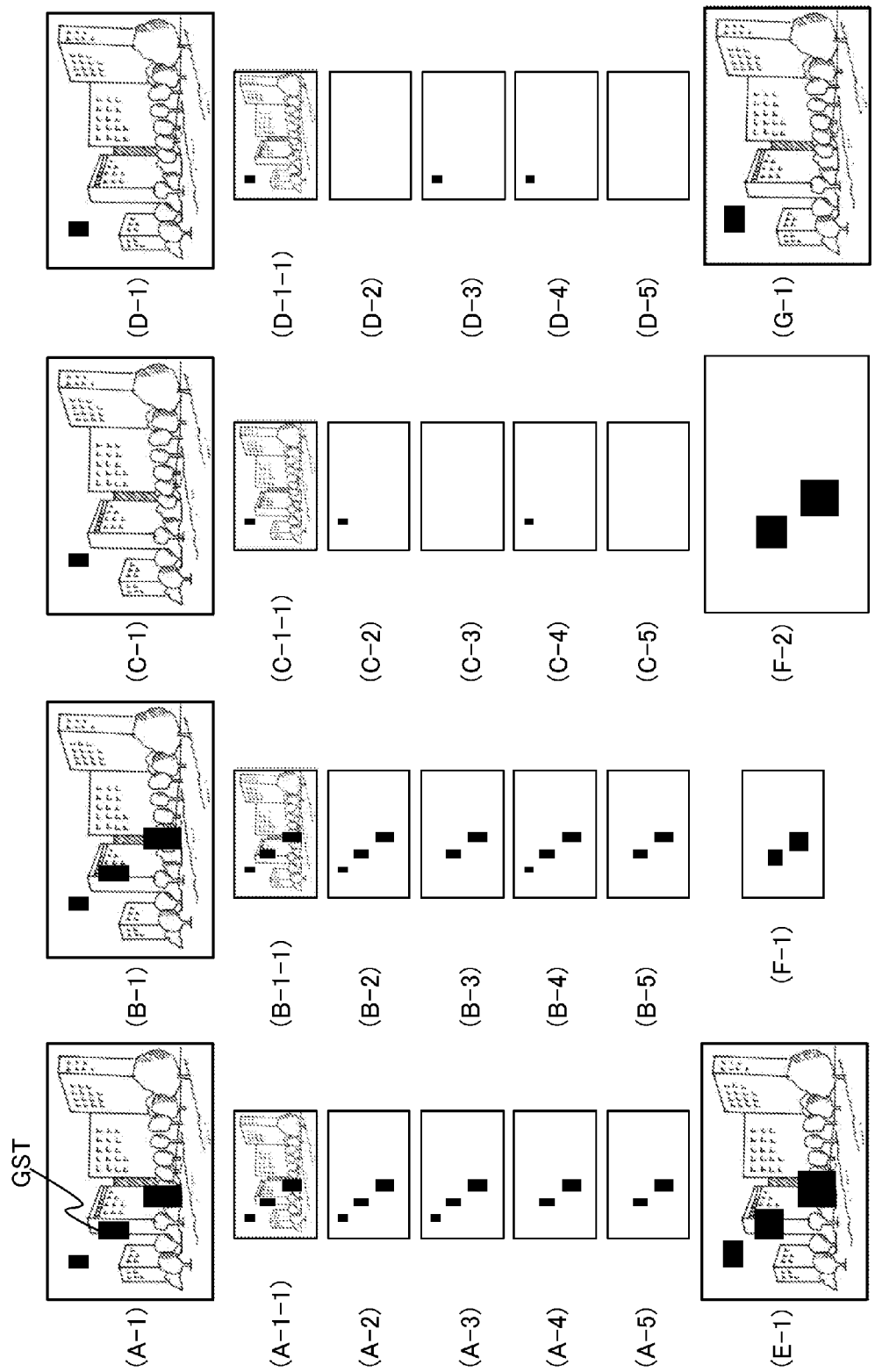
FIG. 22 is a diagram of illustrating a procedure of an image processing method in Embodiment 4.

Next, referring to FIG. 22, a method of determining the unnecessary component as an image component appearing by the photoelectric conversion of unnecessary light in a captured image generated by imaging by using the image pickup apparatus 200a will be described. FIG. 22 is a diagram of illustrating a procedure of an image processing method in this embodiment.

FIG. 22 (A-1), FIG. 22 (B-1), FIG. 22 (C-1), and FIG. 22 (D-1) illustrate a set of parallax images obtained as a result of photoelectric conversion by pixel groups G1, G2, G3, and G4 where light beams passing through the pupil regions P1, P2, P3, and P4 are received, respectively. The set of parallax images contain unnecessary components GST schematically illustrated as black squares, and parts (at the upper left) of the unnecessary components GST in FIG. 22 (B-1) and FIG. 22 (C-1) overlap at the same position. In addition, parts (at the upper left) of the unnecessary components GST in FIG. 22 (A-1) and FIG. 22 (D-1) overlap at the same position. On the other hand, all positions of the unnecessary components are different from each other between FIG. 22 (A-1) and FIG. 22 (B-1). FIG. 22 (A-1-1), FIG. 22 (B-1-1), FIG. 22 (C-1-1), and FIG. 22 (D-1-1) are results of the reduction processing performed on the respective parallax images.

FIG. 22 (A-2) is an image of the difference information obtained by subtracting the image of FIG. 22 (B-1-1) from the image of FIG. 22 (A-1-1) as a reference image with respect to the set of parallax images. This image contains a parallax component of an object and the unnecessary component described above as the difference information. While the unnecessary component contained in the image of FIG. 22 (B-1-1) is calculated as negative values by the difference calculation, for simplifying unnecessary component reduction processing at the latter stage, the negative values are truncated in the image of FIG. 22 (A-2). The same is true for all other difference images. Accordingly, the difference image of FIG. 22 (A-2) indicates only the unnecessary components contained in the image of FIG. 22 (A-1-1).

FIG. 22 (A-3) is a difference image obtained by subtracting the image of FIG. 22 (C-1-1) from the image of FIG. 22 (A-1-1) as a reference image with respect to the set of parallax images. FIG. 22 (A-4) is a difference image obtained by subtracting the image of FIG. 22 (D-1-1) from the image of FIG. 22 (A-1-1) as the reference image with respect to the set of parallax images. This image contains a parallax component of an object and the unnecessary component described above as difference information. As described above, parts (at the upper left) of the unnecessary components overlap with each other at the same position between the images of FIG. 22 (A-1-1) and FIG. 22 (D-1-1), and accordingly the unnecessary component at the upper left is not detected in the difference information. Thus, the unnecessary components generated at the same position do not appear in the difference image.

FIG. 22 (A-5) is information (minimum difference information or minimum difference image) obtained by extracting a minimum value between difference information at each pixel position in the difference images of FIG. 22 (A-2), FIG. 22 (A-3), and FIG. 22 (A-4) as difference information acquired as two-dimensional data. In this embodiment, the image information has a value equivalent to that of the image of FIG. 22 (A-4), and it corresponds to a position and an amount of a part of the unnecessary component contained in the image of FIG. 22 (A-1-1).

Similarly, FIG. 22 (B-2) is a difference image obtained by subtracting the image of FIG. 22 (A-1-1) from the image of FIG. 22 (B-1-1) as a reference image with respect to the set of parallax images. FIG. 22 (B-3) is a difference image obtained by subtracting the image of FIG. 22 (C-1-1) from the image of FIG. 22 (B-1-1) as the reference image with respect to the set of parallax images. FIG. 22 (B-4) is a difference image obtained by subtracting the image of FIG. 22 (D-1-1) from the image of FIG. 22 (B-1-1) as the reference image with respect to the set of parallax images. FIG. 22 (B-5) is the minimum difference information obtained by extracting a minimum value of the difference information at each pixel position in the difference images of FIG. 22 (B-2), FIG. 22 (B-3), and FIG. 22 (B-4) as difference information acquired as two-dimensional data. In this embodiment, the image information has values equivalent to those in the image of FIG. 22 (B-3), and it includes a position and an amount of apart of the unnecessary component contained in the image of FIG. 22 (B-1-1).

Similarly, FIG. 22 (C-2) is a difference image obtained by subtracting the image of FIG. 22 (A-1-1) from the image of FIG. 22 (C-1-1) as a reference image with respect to the set of parallax images. FIG. 22 (C-3) is a difference image obtained by subtracting the image of FIG. 22 (B-1-1) from the image of FIG. 22 (C-1-1) as the reference image with respect to the set of parallax images. FIG. 22 (C-4) is a difference image obtained by subtracting the image of FIG. 22 (D-1-1) from the image of FIG. 22 (C-1-1) as the reference image with respect to the set of parallax images. FIG. 22 (C-5) is minimum difference information obtained by extracting a minimum value of the difference information at each pixel position in difference images of FIG. 22 (C-2), FIG. 22 (C-3), and FIG. 22 (C-4) as difference information acquired as two-dimensional data. In this embodiment, the image information has values equivalent to values in the image of FIG. 22 (C-3), and a position and an amount of the unnecessary component contained in the image of FIG. 22 (C-1-1) are not detected.

Similarly, FIG. 22 (D-2) is a difference image obtained by subtracting the image of FIG. 22 (A-1-1) from the image of FIG. 22 (D-1-1) as a reference image with respect to the set of parallax images. FIG. 22 (D-3) is a difference image obtained by subtracting the image of FIG. 22 (B-1-1) from the image of FIG. 22 (D-1-1) as the reference image with respect to the set of parallax images. FIG. 22 (D-4) is a difference image obtained by subtracting the image of FIG. 22 (C-1-1) from the image of FIG. 22 (D-1-1) as the reference image with respect to the set of parallax images. FIG. 22 (D-5) is minimum difference information obtained by extracting a minimum value of the difference information at each pixel position in difference images of FIG. 22 (D-2), FIG. 22 (D-3), and FIG. 22 (D-4) as difference information acquired as two-dimensional data. In this embodiment, the image information has values equivalent to values in the image of FIG. 22 (D-2), and a position and an amount of the unnecessary component contained in the image of FIG. 22 (D-1-1) are not detected.

Next, each of the images of FIG. 22 (A-5), FIG. 22 (B-5), FIG. 22 (C-5), and FIG. 22 (D-5) are synthesized. FIG. 22 (F-1) is a result of smoothing processing performed on the synthesized image. FIG. 22 (F-2) is a result of magnification processing to restore the image size to an original image size that corresponds to a size of an image acquired before the reduction processing is performed. Then, correction processing of removing or reducing the unnecessary component determined as described above is performed on an image to be output. Accordingly, as illustrated in FIG. 22 (G-1), each parallax image in which the unnecessary component is generally vanished (removed) can be obtained. Specifically, an image (FIG. 22 (E-1)) obtained by synthesizing each of the parallax images of FIG. 22 (A-1), FIG. 22 (B-1), FIG. 22 (C-1), and FIG. 22 (D-1) is prepared, and then the image of FIG. 22 (F-2) is subtracted from the image of FIG. 22 (E-1). As a result, an image in which the unnecessary component other than that in the overlapped region has been reduced can be obtained.

Figure 23:
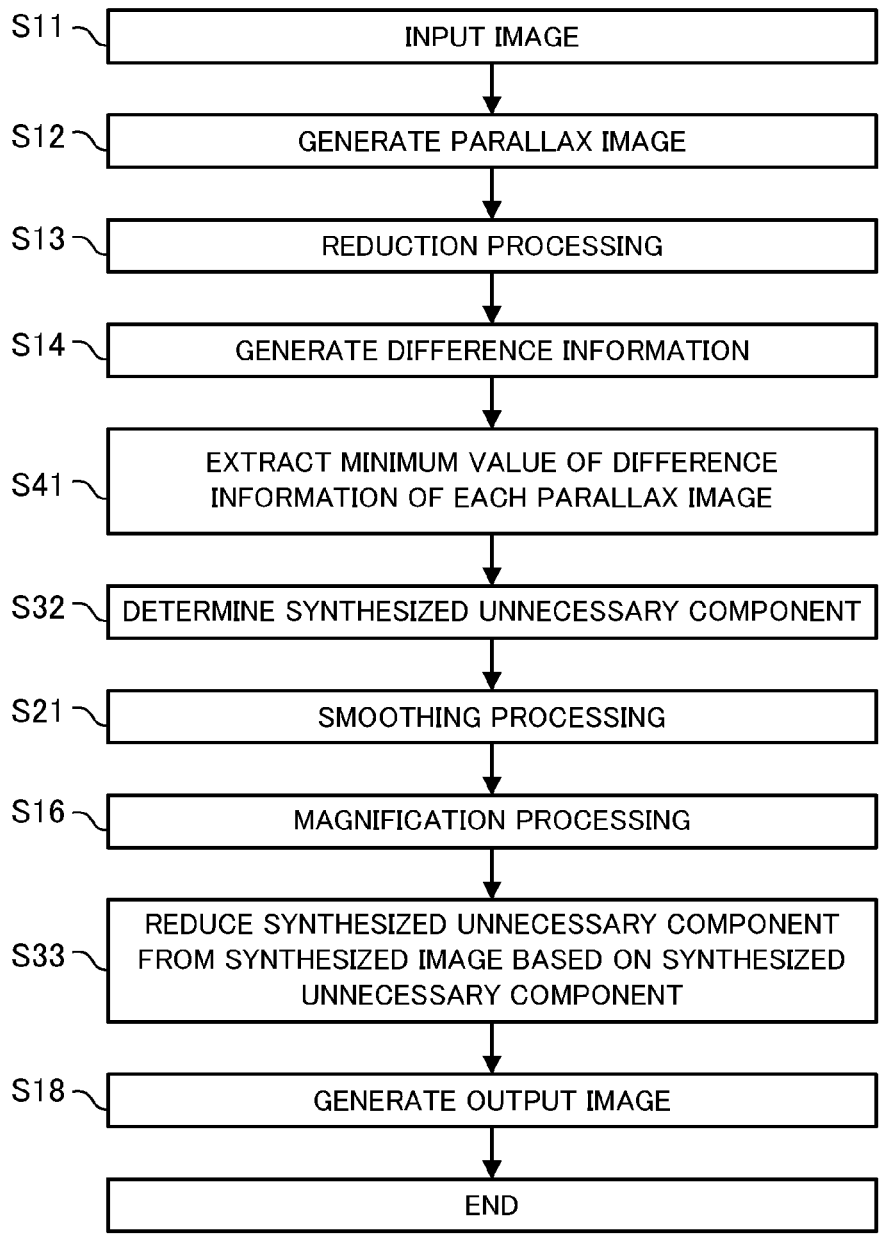
FIG. 23 is a flowchart of illustrating an image processing method in Embodiment 4.

Next, referring to FIG. 23, an image processing method in this embodiment will be described. FIG. 23 is a flowchart of illustrating the image processing method in this embodiment. Each step in FIG. 23 is performed by the system controller 210 or the image processor 204 according to an image processing program as a computer program. The image processing method of this embodiment is different from the image processing method of Embodiment 3 described referring to FIG. 21 in that a step (step S41) of extracting a minimum value of difference information of each parallax image, instead of a step (step S31) of extracting the maximum value of the difference information of each parallax image. Other processing is the same as that of Embodiment 3, and accordingly descriptions thereof will be omitted.

At step S41, the image processor 204 (unnecessary component detector 204*a*) extracts a minimum value of the difference information at each pixel position in the difference image obtained by using each parallax image obtained at step S14 as a reference image. Hereinafter, an effect of extracting the minimum value between the plurality of pieces of difference information will be described. As described in this embodiment, with respect to the images of FIG. 22 (B-1) and FIG. 22 (C-1) or the images of FIG. 22 (A-1) and FIG. 22 (D-1), parts of the unnecessary components overlap with each other at the same position. Thus, there is a possibility that the unnecessary component occurs at the same position in parallax images depending on the optical system or a position of a high-luminance light source. In this case, the unnecessary component indicates a value of zero when the difference between these two images is calculated.

When the minimum value of the difference information is acquired differently from Embodiment 3, an overlapped unnecessary component cannot be detected while an unnecessary component located at different positions between all parallax images as illustrated in FIG. 22. However, this corresponds to detection of only a component occurring in one of the plurality of parallax images, and also it corresponds to separation of a parallax component of an object for three parallax images from the unnecessary component with respect to the parallax component of the object occurring when capturing a close-range object. In other words, when the unnecessary component reduction processing is performed on an image in which the close-range object is captured, the influence of the parallax image of the object can be greatly reduced. Accordingly, by acquiring the plurality of pieces of difference information to extract minimum difference information of the plurality of pieces of difference information, the unnecessary component other than the overlapped unnecessary component can be detected and also the parallax component of the object for the three parallax images can be separated at the same time. As a modification of this embodiment, the modification described in each of Embodiments 1 and 2 can also be applied.

According to this embodiment, the calculation load amount in the image processing can be reduced when the unnecessary component formed by the unnecessary light (ghost) from the difference information based on a plurality of parallax images obtained by image capturing a plurality of times is determined. Furthermore, by applying the smoothing processing in addition to the reduction processing, the high quality of an image can be maintained even when the determined unnecessary component is reduced or removed.

[Embodiment 5]

Next, Embodiment 5 of the present invention will be described. Ren. Ng et al., "Light Field Photography with a Hand-held Plenoptic Camera" (Stanford Tech Report CTSR 2005-2) discloses a "plenoptic camera". The "plenoptic camera" can acquire information of the position and angle of a light beam from an object by using a technique called "light field photography".

Figure 24:
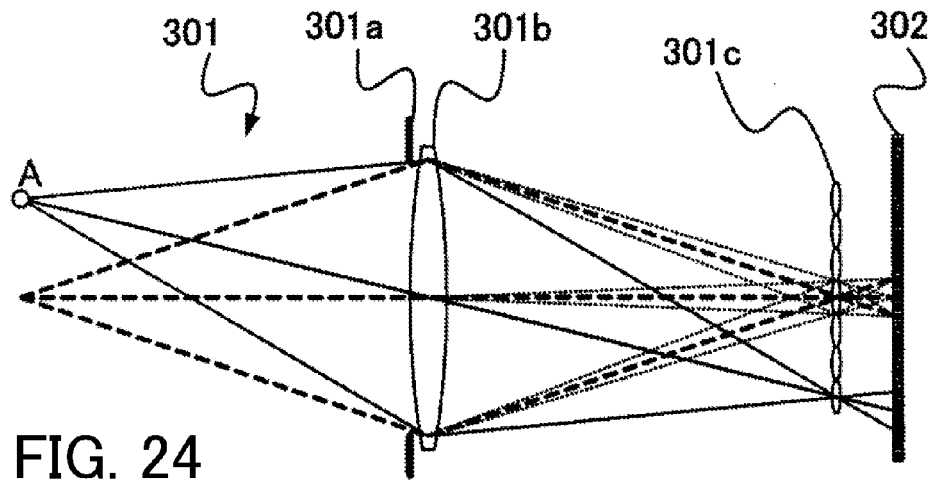
FIG. 24 is a diagram of illustrating an image pickup system in Embodiment 5.

FIG. 24 illustrates an image pickup system of an image pickup apparatus in this embodiment, and illustrates a configuration of the image pickup system of the "plenoptic camera". An optical system 301 (image pickup optical system) includes a primary lens 301b (image pickup lens) and an aperture stop 301a. A micro lens array 301c is disposed at an imaging position of the optical system 301, and an image pickup element 302 is disposed behind (closer to an image than) the micro lens array 301c. The micro lens array 301c has a function as a separator (separating member) that prevents a light beam passing through, for example, a point A in an object space from being mixed with a light beam passing through a point near the point A on the image pickup element 302. FIG. 24 illustrates that a top beam, a primary light beam, and a bottom beam from the point A are received by pixels different from each other. Thus, the light beams passing through the point A can be separately acquired depending on their angles.

Figure 25:
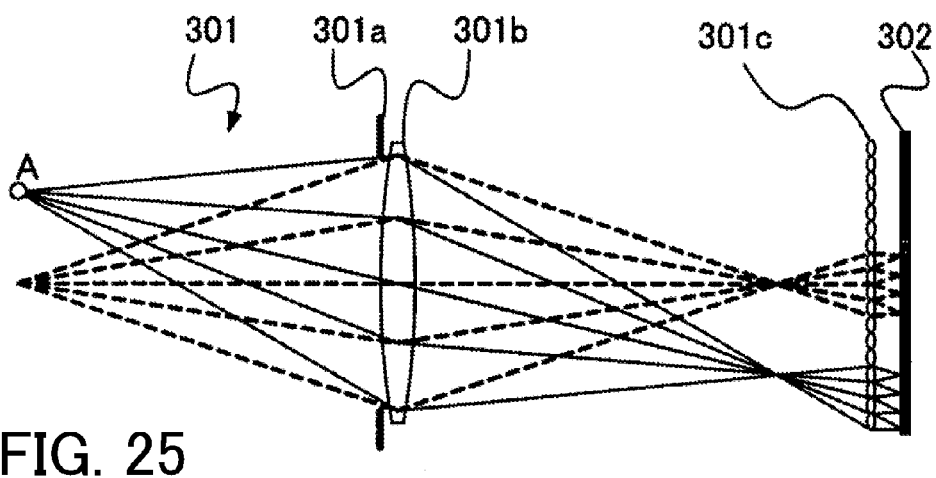
FIG. 25 is a diagram of illustrating an image pickup system in Embodiment 5.
Figure 26:
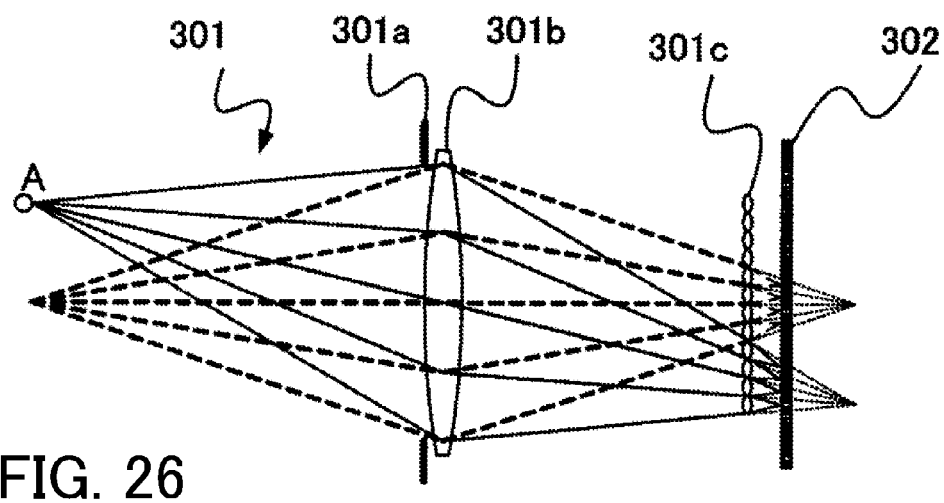
FIG. 26 is a diagram of illustrating an image pickup system in Embodiment 5.

Todor Georgive et al., "Full Resolution Light Field Rendering" (Adobe Technical Report January 2008) discloses configurations of an image pickup system illustrated in FIGS. 25 and 26 that acquire information (light field) of the position and angle of a light beam.

Figure 27:
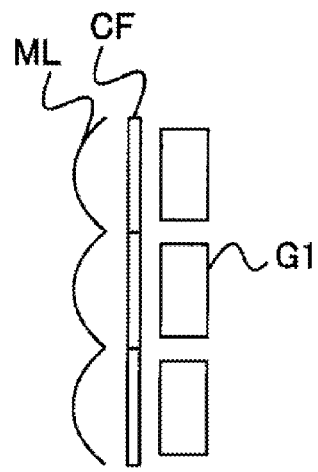
FIG. 27 is a diagram of illustrating a conventional image pickup element.

With the configuration of the image pickup system illustrated in FIG. 25, the micro lens array 301c is disposed behind (closer to an image than) the imaging position of the primary lens 301b to reimage the light beams passing through the point A on the image pickup element 302, thereby separately acquiring the light beams depending on their angles. With the configuration of the image pickup system illustrated in FIG. 26, the micro lens array 301c is disposed in front of (closer to an object than) the imaging position of the primary lens 301b to image the light beams passing through the point A on the image pickup element 302, thereby separately acquiring the light beams depending on their angles. In both configurations, light beams passing through a pupil of the optical system 301 are separated depending on passed regions (passed positions) in the pupil. In these configurations, the image pickup element 302 may employ a conventional image pickup element including one micro lens ML and one light-receiving portion G1 that are paired via a color filter CF as illustrated in FIG. 27.

Figure 28A:
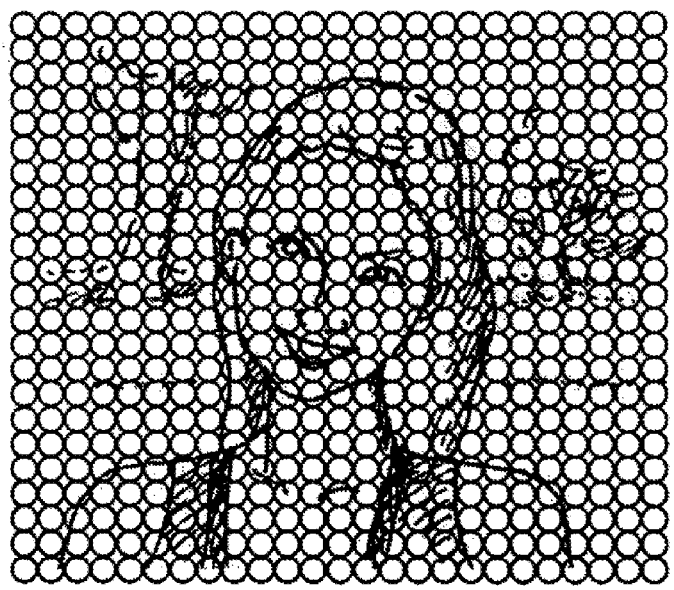
FIGS. 28A and 28B are diagrams of illustrating images obtained through the image pickup system in FIG. 24.
Figure 28B:
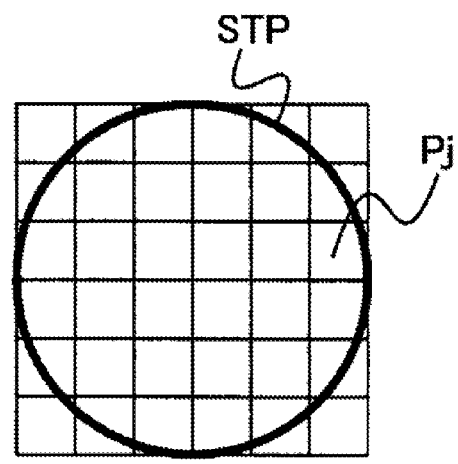
Figure 29:
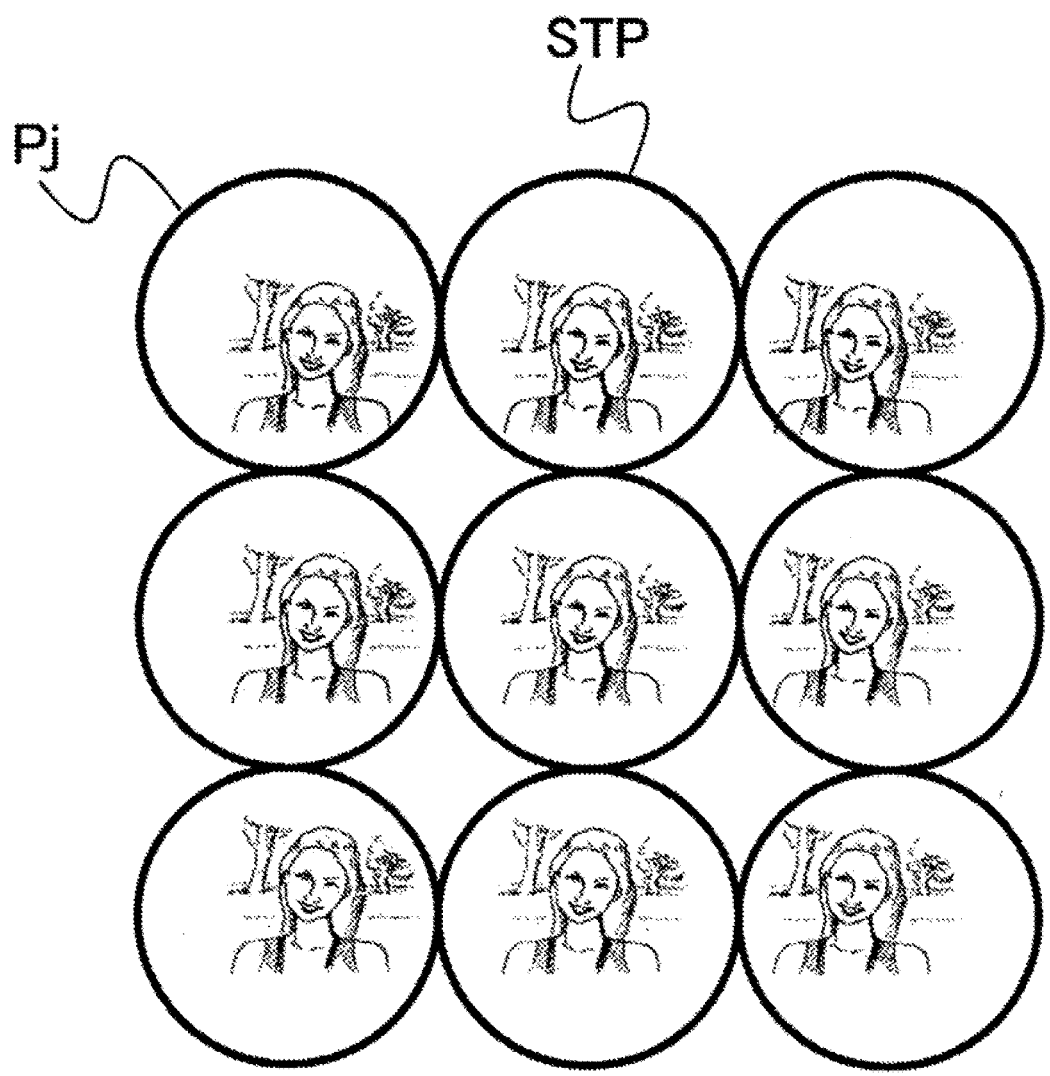
FIG. 29 is a diagram of illustrating an image obtained through the image pickup system in each of FIGS. 25 and 26.

The optical system 301 illustrated in FIG. 24 yields an image as illustrated in FIG. 28A. FIG. 28B is an enlarged view of one of arrayed circles in FIG. 28A. One circle represents the aperture stop STP, and an inside thereof is divided by a plurality of pixels Pj (j=1, 2, 3, . . . ). This configuration allows the intensity distribution of the pupil within one circle to be acquired. The optical system 301 illustrated in FIGS. 25 and 26 are used to obtain parallax images illustrated in FIG. 29. The parallax images as illustrated in FIG. 29 may be obtained by rearranging and reconstructing the pixels Pj in the circles (aperture stops STP) in an image illustrated in FIG. 28A.

As described in Embodiment 1 to 4, unnecessary light such as ghost passes through the pupil with biased distribution across the pupil. Thus, the image pickup apparatus in this embodiment that performs image pickup through divided regions of the pupil may employ the image processing methods described in Embodiment 1 to 4 to determine unnecessary components and further reduce them.

Figure 30:
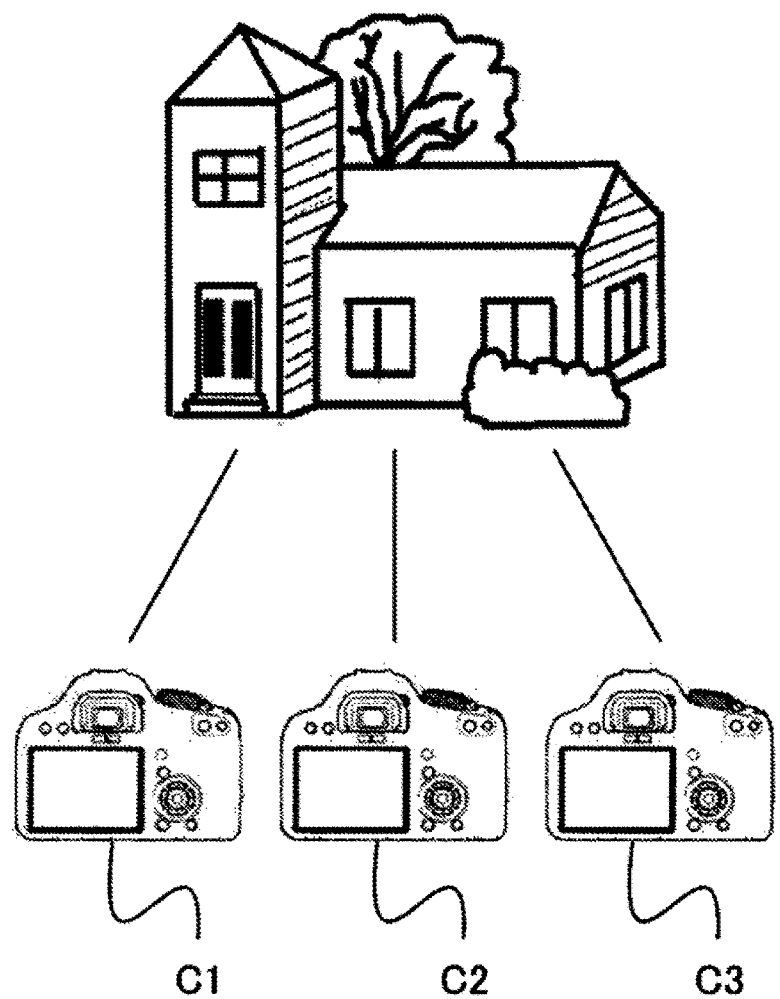
FIG. 30 is a diagram of illustrating an example of an image pickup apparatus in Embodiment 5.
Figure 31:
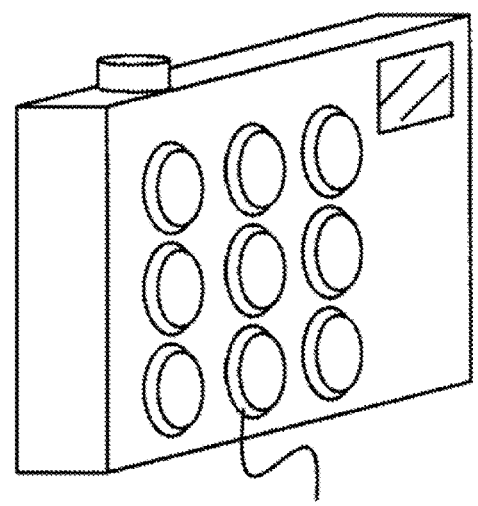
FIG. 31 is a diagram of illustrating an example of an image pickup apparatus in Embodiment 5.

In another example, parallax images are obtained by capturing images of an identical object through a plurality of cameras as illustrated in FIG. 30. Thus, these cameras may employ the image processing methods described in Embodiment 1 to 4. C1, C2, and C3 represent separate image pickup apparatuses, but they may be regarded as a single image pickup apparatus that performs image pickup through three divided regions of a large pupil. Alternatively, as illustrated in FIG. 31, the pupil division may be achieved by providing one image pickup apparatus with a plurality of optical systems OSj (j=1, 2, 3, . . . ).

[Embodiment 6]

Next, Embodiment 6 of the present invention will be described. Each embodiment described above describes the case where the unnecessary component is determined and removed over the entire region of the image, but in many cases, the unnecessary component occurs in part of the image as illustrated in FIGS. 2A and 2B. Since it is easy for a user to determine an unnecessary component region in the image, the process load in each embodiment can be further reduced by specifying an image region to perform the reducing process by the user. Limiting the region, the influence of the object parallax component generated in the photographing of a close-distance object described above can also be reduced.

Figure 32A:
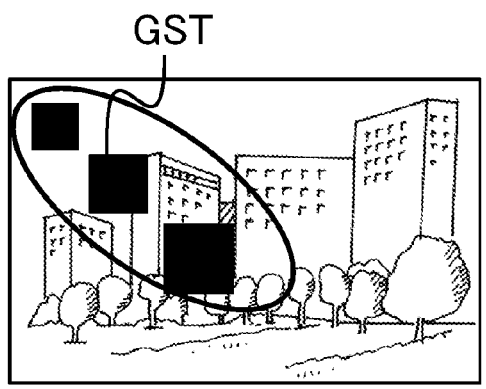
FIGS. 32A and 32B are diagrams of illustrating examples of selecting an unnecessary component reduction processing region in Embodiment 6.
Figure 32B:
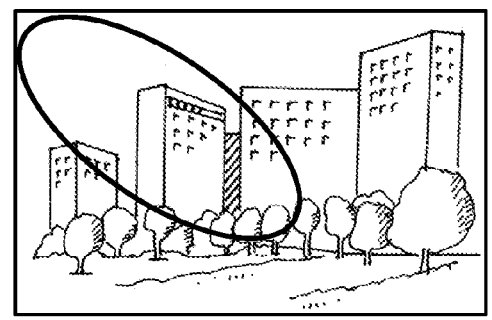

FIGS. 32A and 32B are diagrams of illustrating examples of selecting an unnecessary component reduction processing region. FIG. 32A illustrates a conceptual diagram when a user selects a region to remove an unnecessary component in an image. FIG. 32B illustrates an output image in which the reduction processing on the unnecessary component in the selected region indicated by a solid line has been performed. Even when a range of the region is limited, the unnecessary component can be determined based on the parallax image by using the image processing method similar to that of each of Embodiments 1 to 4, and in addition, the unnecessary component can be reduced.

When the user specifies the region as described in this embodiment or the region of the unnecessary component is known by a known method, the reduction rate may be determined by the reduction processor 204b as described above depending on a size of the region of the unnecessary component to perform the reduction processing. In other words, when the size of the region of the unnecessary component is large, the reduction rate is decreased. On the other hand, when the region of the unnecessary component is small, it is preferred that the reduction rate is adjusted to avoid the collapse of the region which is smaller than or equal to one pixel due to the reduction processing. By setting the reduction rate to increase in a range where an effect of the unnecessary component reduction can be kept, the processing load can be further reduced.

Each embodiment describes the case where the unnecessary component is removed or reduced, but correction processing to add other unnecessary components may be performed by using information (unnecessary component information) relating to the determined unnecessary component. For example, with respect to each of the plurality of parallax images illustrated in FIG. 29, there are an image which contains the ghost (unnecessary component) and an image which does not contain the ghost. If the ghost is to remain in a reconstructed image, the determined ghost may be added to each parallax image. The ghost can also be added to the reconstructed image.

Each of the embodiments describes the image pickup apparatus that performs the image processing method of each embodiment (is provided with the image processing apparatus), but the image processing method of each embodiment may be performed by an image processing program installed in a personal computer. In this case, the personal computer corresponds to the image processing apparatus of each embodiment. The personal computer takes in (acquires) an image (input image) generated by the image pickup apparatus and yet to be provided with image processing, and outputs an image obtained by performing the image processing by the image processing program.

As described above, the image processing apparatus (image processor 204) includes the unnecessary component determiner (unnecessary component detector 204a), the reduction processor 204b, the magnification processor 204c, and the unnecessary component reducer 204d. The unnecessary component determiner determines unnecessary component information (i.e, information relating to unnecessary components) of a parallax image based on difference information relating to a plurality of parallax images. The reduction processor performs reduction processing (i.e., reduces an information amount) on at least one of the parallax image, the difference information, and the unnecessary component information. The magnification processor performs magnification processing (i.e., increases an information amount) on the unnecessary component information. The unnecessary component reducer reduces an unnecessary component (or synthesized unnecessary component which is obtained by synthesizing unnecessary components of the respective parallax images), based on the unnecessary component information, from the parallax image or a synthesized image obtained by synthesizing the plurality of parallax images.

Preferably, the reduction processor performs the reduction processing on each of the plurality of parallax images. The unnecessary component determiner determines the unnecessary component information based on the difference information relating to the plurality of reduced parallax images. The, the magnification processor performs the magnification processing so as to restore a size of the unnecessary component information to a size (i.e., original size) acquired before the reduction processing is performed. Preferably, the reduction processor performs the reduction processing on the difference information. The unnecessary component determiner determines the unnecessary component information based on the reduced difference information. Then, the magnification processor performs the magnification processing so as to restore a size of the unnecessary component information to a size (i.e., original size) acquired be fore the reduction processing is performed. Preferably, the reduction processor performs the reduction processing on the unnecessary component information determined based on the plurality of parallax images. Then, the magnification processor performs the magnification processing so as to restore a size of the reduced unnecessary component information to a size (i.e., original size) acquired before the reduction processing is performed.

Preferably, the image processing apparatus includes the noise reducer 204e that performs smoothing processing to reduce a noise. More preferably, the noise reducer performs the smoothing processing after the reduction processor performs the reduction processing. More preferably, the noise reducer performs the smoothing processing on at least one of the parallax image, the difference information, and the unnecessary component information. Preferably, the noise reducer performs the smoothing processing depending on a reduction rate of the reduction processing before the reduction processor performs the reduction processing.

Preferably, the reduction processor performs the reduction processing by using a reduction rate determined based on the unnecessary component information (for example, size of the unnecessary component). Preferably, the unnecessary component reducer performs an alignment of the plurality of parallax images. Preferably, the reduction processor performs the reduction processing by at least one of decimating processing of pixels (decimating processing performed between pixels), averaging processing of pixel values (averaging of pixel values of a plurality of peripheral pixels), and pixel addition processing (processing to combine pixel values of a plurality of pixels into one pixel value by using a certain weight). Preferably, the unnecessary component determiner determines the unnecessary component information based on a maximum value or a minimum value of the difference information at each position.

Preferably, the difference information is obtained by setting each of the plurality of parallax images as a reference image and by calculating a difference between the reference image and a parallax image other than the reference image. Preferably, the difference information is obtained by calculating an absolute value of a difference between two parallax images. More preferably, the unnecessary component determiner acquires the plurality of pieces of difference information as two-dimensional data in which a value not greater than a predetermined threshold value is truncated and extract a maximum value or a minimum value of the plurality of pieces of difference information at each position of the two-dimensional data. Thus, the unnecessary component determiner determines a position and an amount of an unnecessary component in the reference image. Preferably, the unnecessary component determiner sets a region in which the unnecessary component information is to be determined and determines the unnecessary component information within a range of the region. Preferably, the plurality of parallax images are images generated based on light beams passing through regions different from each other in a pupil of an optical system.

[Other Embodiments]

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image processing apparatus, an image pickup apparatus, an image processing method, and a non-transitory computer-readable storage medium which are capable of effectively determining an unnecessary component contained in a captured image without imaging a plurality of times to reduce processing load and maintain a high quality of an image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-039921, filed on Mar. 2, 2015, which is hereby incorporated by reference herein in its entirety.

What is claimed is:

1. An image processing apparatus comprising:
a processor configured to execute a plurality of tasks, including:
an unnecessary component determining task that determines unnecessary component information of a parallax image based on difference information relating to a plurality of parallax images obtained from an optical system, the unnecessary component information corresponding to light reflected inside the optical system;
a reduction task that performs reduction processing on:
at least one of the parallax image or the difference information before the unnecessary component information is determined by the unnecessary component determining task, or
the unnecessary component information determined by the unnecessary component determining task;
a magnification task that performs magnification processing on the unnecessary component information or on synthesized unnecessary component information obtained by synthesizing the unnecessary component information of each of the plurality of parallax images; and
an unnecessary component reducing task that reduces an unnecessary component by subtracting magnified unnecessary component information obtained by the magnification task, from the parallax image or by subtracting magnified synthesized unnecessary component information obtained by the magnification task, from a synthesized image obtained by synthesizing the plurality of parallax images.

2. The image processing apparatus according to claim 1, wherein:
the reduction processing task performs the reduction processing on each of the plurality of parallax images,
the unnecessary component determining task determines the unnecessary component information based on the difference information relating to the plurality of reduced parallax images, and
the magnification task performs the magnification processing to restore a size of the unnecessary component information to a size acquired before the reduction processing is performed.

3. The image processing apparatus according to claim 1, wherein:
the reduction processing task performs the reduction processing on the difference information,
the unnecessary component determining task determines the unnecessary component information based on the reduced difference information, and
the magnification task performs the magnification processing to restore a size of the unnecessary component information to a size acquired before the reduction processing is performed.

4. The image processing apparatus according to claim 1, wherein:
the reduction task performs the reduction processing on the unnecessary component information determined based on the plurality of parallax images, and
the magnification task performs the magnification processing to restore a size of the reduced unnecessary component information to a size acquired before the reduction processing is performed.

5. The image processing apparatus according to claim 1, the plurality of tasks include a noise reducing task that performs smoothing processing to reduce noise.

6. The image processing apparatus according to claim 5, wherein the noise reducing task performs the smoothing processing after the reduction task performs the reduction processing.

7. The image processing apparatus according to claim 5, wherein the noise reducing task performs the smoothing processing on at least one of the parallax image, the difference information, or the unnecessary component information.

8. The image processing apparatus according to claim 5, wherein the noise reducing task performs the smoothing processing depending on a reduction rate of the reduction processing before the reduction task performs the reduction processing.

9. The image processing apparatus according to claim 1, wherein the reduction task performs the reduction processing using a reduction rate determined based on the unnecessary component information.

10. The image processing apparatus according to claim 1, wherein the unnecessary component reducing task performs an alignment of the plurality of parallax images.

11. The image processing apparatus according to claim 1, wherein the reduction task performs the reduction processing by performing at least one of decimating processing of pixels, averaging processing of pixel values, or pixel addition processing.

12. The image processing apparatus according to claim 1, wherein the difference information is obtained by calculating an absolute value of a difference between two parallax images.

13. The image processing apparatus according to claim 1, wherein the unnecessary component determining task determines a pixel position and an amount of an unnecessary component in the reference image by extracting a maximum value or minimum value of differences between the reference image and other parallax images, among the plurality of parallax images, not currently set as the reference image, at corresponding pixel positions of the other parallax images by regarding a value contained in the differences not greater than a predetermined threshold value as zero.

14. The image processing apparatus according to claim 1, wherein the unnecessary component determining task sets a region where the unnecessary component information is to be determined and determines the unnecessary component information within a range of the region.

15. The image processing apparatus according to claim 1, wherein the plurality of parallax images are images generated based on light beams passing through regions different from each other in a pupil of the optical system.

16. The image processing apparatus according to claim 1, wherein the difference information is obtained by sequentially setting each of the plurality of parallax images as a reference image and by calculating a difference between the reference image and one parallax image, among the plurality of parallax images, not currently set as the reference image.

17. An image pickup apparatus comprising:
an image pickup device configured to photoelectrically convert an optical image formed via an optical system to output a plurality of parallax images;
a processor configured to execute a plurality of tasks, including:
an unnecessary component determining task that determines unnecessary component information of a parallax image based on difference information relating to the plurality of parallax images, the unnecessary component information corresponding to light reflected inside the optical system;
a reduction task that performs reduction processing on:
at least one of the parallax image or the difference information, before the unnecessary component information is determined by the unnecessary component determining task, or
the unnecessary component information determined by the unnecessary component determining task;
a magnification task that performs magnification processing on the unnecessary component information or on synthesized unnecessary component information obtained by synthesizing the unnecessary component information of each of the plurality of parallax images; and
an unnecessary component reducing task that reduces an unnecessary component by subtracting magnified unnecessary component information obtained by the magnification task, from the parallax image or by subtracting magnified synthesized unnecessary component information obtained by the magnification task, from a synthesized image obtained by synthesizing the plurality of parallax images.

18. The image pickup apparatus according to claim 17, wherein:
the plurality of parallax images are images generated based on light beams passing through regions different from each other in a pupil of the optical system,
the image pickup device includes a plurality of pixels sharing a single micro lens, and
the plurality of pixels are configured to receive the light beams passing through the regions different from each other in the pupil of the optical system.

19. The image pickup apparatus according to claim 17, wherein the plurality of parallax images are images generated by guiding light beams passing through regions different from each other in a pupil of the optical system to pixels of the image pickup device different from each other.

20. An image processing method comprising the steps of:
determining unnecessary component information of a parallax image based on difference information relating to a plurality of parallax images obtained from an optical system, the unnecessary component information corresponding to light reflected inside the optical system;
performing reduction processing on:
at least one of the parallax image or the difference information, before the determining step determining the unnecessary component information, or
the unnecessary component information determined in the determining step;
performing magnification processing on the unnecessary component information or on synthesized unnecessary component information obtained by synthesizing the unnecessary component information of each of the plurality of parallax images; and
reducing an unnecessary component by subtracting magnified unnecessary component information obtained in the magnification performing step, from the parallax image or by subtracting magnified synthesized unnecessary component information obtained in the magnification performing step, from a synthesized image obtained by synthesizing the plurality of parallax images.

21. A non-transitory computer-readable storage medium which stores a program causing a computer to execute a process comprising the steps of:
determining unnecessary component information of a parallax image based on difference information relating to a plurality of parallax images obtained from an optical system, the unnecessary component information corresponding to light reflected inside the optical system;
performing reduction processing on:
at least one of the parallax image or the difference information, before the determining step determining the unnecessary component information, or
the unnecessary component information determined in the determining step;
performing magnification processing on the unnecessary component information or on synthesized unnecessary component information obtained by synthesizing the unnecessary component information of each of the plurality of parallax images; and
reducing an unnecessary component by subtracting a magnified unnecessary component information obtained in the magnification performing step, from the parallax image or by subtracting magnified synthesized unnecessary component information obtained in the magnification performing step, from a synthesized image obtained by synthesizing the plurality of parallax images.

* * * * *